United States Patent
Verma et al.

(10) Patent No.: US 12,081,260 B2
(45) Date of Patent: Sep. 3, 2024

(54) ULTRA-WIDE BAND CHANNEL ACCESS—OPPORTUNISTIC RESERVATION

(71) Applicant: Apple Inc., Cupertino, CA (US)

(72) Inventors: Lochan Verma, Danville, CA (US); Alexander Krebs, Munich (DE); Yong Liu, Campbell, CA (US); Jinjing Jiang, Campbell, CA (US)

(73) Assignee: Apple Inc., Cupertino, CA (US)

( * ) Notice: Subject to any disclaimer, the term of this patent is extended or adjusted under 35 U.S.C. 154(b) by 41 days.

(21) Appl. No.: 17/951,280

(22) Filed: Sep. 23, 2022

(65) Prior Publication Data

US 2023/0387962 A1    Nov. 30, 2023

Related U.S. Application Data

(60) Provisional application No. 63/347,486, filed on May 31, 2022.

(51) Int. Cl.
*H04B 1/7183* (2011.01)
*H04W 74/0808* (2024.01)

(52) U.S. Cl.
CPC ...... *H04B 1/7183* (2013.01); *H04W 74/0808* (2013.01)

(58) Field of Classification Search
CPC .............. H04B 1/183; H04W 74/0808
See application file for complete search history.

(56) References Cited

U.S. PATENT DOCUMENTS

| | | | | |
|---|---|---|---|---|
| 8,798,029 | B2* | 8/2014 | Soliman | H04W 48/14 370/350 |
| 2013/0310045 | A1* | 11/2013 | Yan | H04B 7/0404 455/437 |
| 2016/0302026 | A1 | 10/2016 | Lee | |
| 2017/0347255 | A1* | 11/2017 | Liu | H04W 8/005 |
| 2019/0135229 | A1* | 5/2019 | Ledvina | H04W 76/10 |
| 2021/0076434 | A1* | 3/2021 | Hariharan | H04W 88/06 |
| 2022/0007333 | A1* | 1/2022 | Lee | H04W 76/14 |
| 2022/0416989 | A1* | 12/2022 | Lee | H04L 5/0094 |
| 2023/0037601 | A1* | 2/2023 | Lee | H04W 76/14 |
| 2023/0276212 | A1* | 8/2023 | Bansal | H04W 4/80 455/414.1 |
| 2023/0387962 | A1* | 11/2023 | Verma | H04W 84/18 |

OTHER PUBLICATIONS

Extended European Search Report for EP Patent Application No. 23175967.1; Oct. 18, 2023.
Lee et al. "Narrowband-UWB Coupling MAC"; Project: IEEE P802.15 Working Group for Wireless Personal Area Networks; Sep. 2021.
Ravichandran et al. "Design and Analysis of a Dual radio node architecture and Medium Access Control protocols for Ultra Wide Band based sensor networks"; 4th International Conference IEEE Broadband Communications, Networks and Systems; Sep. 10, 2007.

* cited by examiner

*Primary Examiner* — Jaison Joseph
(74) *Attorney, Agent, or Firm* — Kowert, Hood, Munyon, Rankin & Goetzel, P.C.

(57) ABSTRACT

Systems, methods, and mechanisms for an out-of-band (OOB) ultra-wide band (UWB) channel arbitration and/or channel coordination scheme. A device may scan an arbitration channel for a first time period, and based on the scanning, that the arbitration channel is not in use. The device may perform, on the arbitration channel, a first channel access procedure and perform, on the UWB channel, UWB communications during a UWB channel transmission opportunity.

20 Claims, 15 Drawing Sheets

ULTRA-WIDE BAND CHANNEL ACCESS—OPPORTUNISTIC RESERVATION

PRIORITY INFORMATION

This application claims benefit of priority to U.S. Provisional Application Ser. No. 63/347,486, titled "Ultra-Wide Band Channel Access", filed May 31, 2022, which is hereby incorporated by reference in its entirety as though fully and completely set forth herein.

FIELD

The present application relates to wireless communications, including techniques for an out-of-band (OOB) ultra-wide band (UWB) channel arbitration and/or channel coordination scheme, e.g., embodiments described herein define arbitration, coordination, and/or access schemes via a channel in a non-UWB frequency band and over a radio other than a UWB radio.

DESCRIPTION OF THE RELATED ART

In current implementation, ultra-wide band (UWB) channels do not have channel/medium access rules, e.g., such as a Listen Before Talk (LBT) regulatory rule. Given the nature of UWB channels, such an LBT procedure would be a power-hungry operation for a UWB radio. Thus, the lack of such access rules is a blessing and a curse for UWB channels. The blessing is a UWB radio may transmit without channel access delay from Listen Before Talk and not consume much needed power (e.g., especially for low power devices such as positional tags (e.g., multi-interface radio frequency transponder (MIT) devices) and/or client stations). The curse is that a lack of arbitration (e.g., channel/medium access rules) of UWB channels leads to collisions when a plurality of transmitters attempt to use UWB channels within a common area. Therefore, improvements are desired.

SUMMARY

Embodiments described herein relate to systems, methods, and mechanisms for an out-of-band (OOB) ultra-wide band (UWB) channel arbitration and/or channel coordination scheme, e.g., embodiments described herein define arbitration, coordination, and/or access schemes via a channel in a non-UWB frequency band and over a radio other than a UWB radio.

For example, in some embodiments, a wireless station, may participate in a peer-to-peer (P2P) data communication over an ultra-wide band (UWB) channel with another wireless station. The wireless station may perform arbitration of the UWB channel on an arbitration channel (e.g., on an OOB channel). Further, post successful arbitration, the wireless station may claim the UWB channel for a duration of a transmission (or transmit) opportunity.

As another example, in some embodiments, a wireless station may participate in a peer-to-peer (P2P) data communication over an ultra-wide band (UWB) channel with another wireless station. The wireless station may perform coordination of the UWB channel on an advertisement channel (e.g., on an OOB channel). Further, post successful coordination of the UWB channel, the wireless station may claim the UWB channel for a duration of a transmission (or transmit) opportunity.

As a further example, in some embodiments, a wireless station may participate in a peer-to-peer (P2P) data communication over an ultra-wide band (UWB) channel with another wireless station. The wireless station may access the UWB channel based on periodic advertisements transmitted on an advertisement channel (e.g., on an OOB channel). Further, post advertisement, the wireless station may claim the UWB channel for a duration of a transmission (or transmit) opportunity.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
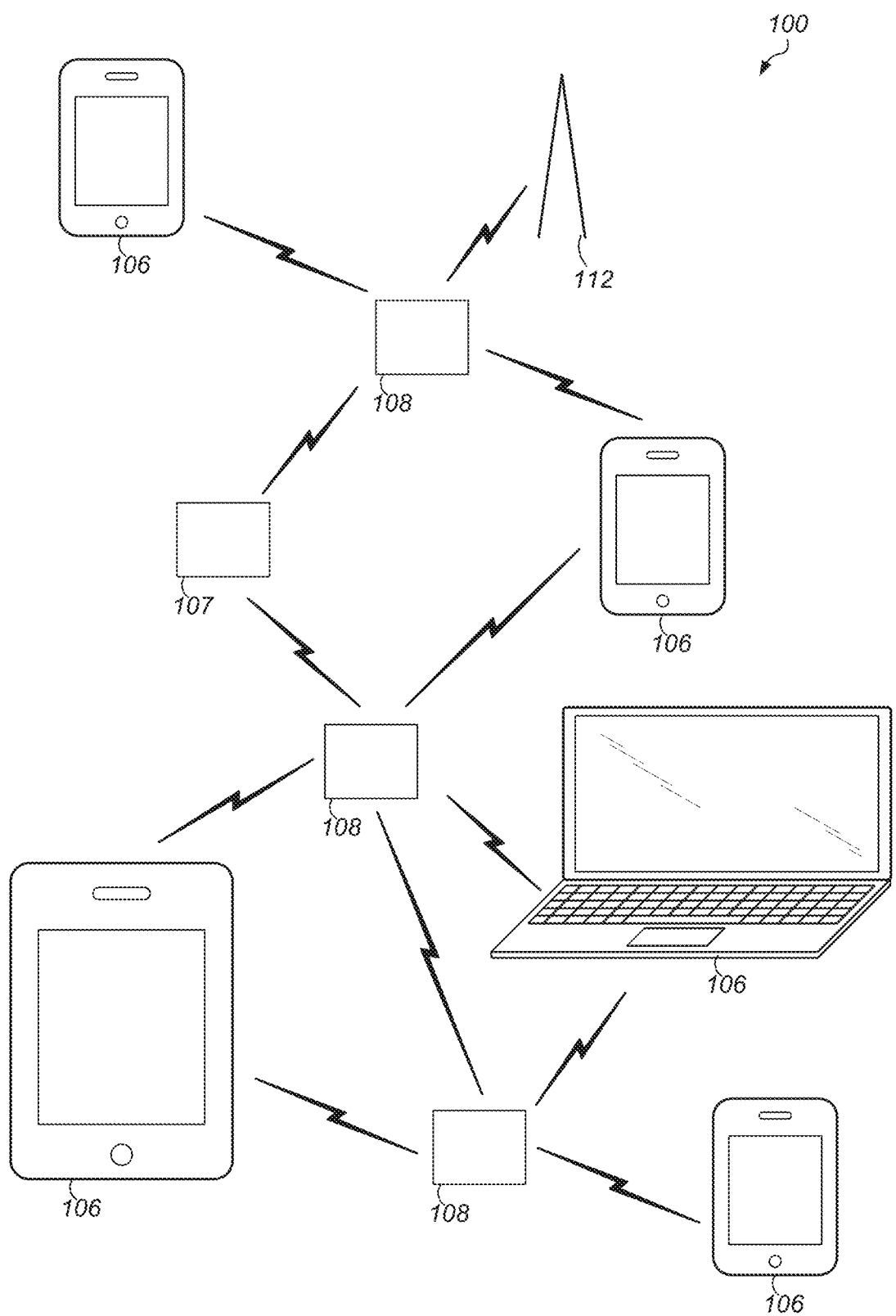
FIG. 1 illustrates an example of a wireless communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:
UE: User Equipment
AP: Access Point
TX: Transmission/Transmit
RX: Reception/Receive
UWB: Ultra-wideband
BT/BLE: BLUETOOTH™/BLUETOOTH™ Low Energy
LAN: Local Area Network
WLAN: Wireless LAN
RAT: Radio Access Technology Terminology The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Positional Tag (or tracking device)—any of various types of computer systems devices which are mobile or portable and which performs wireless communications, such as communication with a neighboring or companion device to share, determine, and/or update a location of the positional tag. Wireless communication can be via various protocols, including, but not limited to, Bluetooth, Bluetooth Low Energy (BLE), Wi-Fi, ultra-wide band (UWB), and/or one or more proprietary communication protocols.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™ Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™, PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example, a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, e.g., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, signaling, messaging, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Exemplary Wireless Communication System and Devices

FIG. 1 illustrates an example wireless communication system, according to some embodiments. It is noted that the system of FIG. 1 is merely one example of a possible system, and embodiments of this disclosure may be implemented in any of various systems, as desired. As shown, the exemplary system 100 includes a plurality of wireless client stations or devices, or user equipment (UEs), 106 that are configured to communicate wirelessly with various components within the system 100, such as an Access Point (AP) 112, other client stations 106, wireless nodes 107, and/or positional tag devices 108. Some implementations can include one or more base stations in addition to, or in place of, AP 112. The AP 112 may be a Wi-Fi access point and may include one or more other radios/access technologies (e.g., Bluetooth (BT), ultra-wide band (UWB), etc.) for wirelessly communicating with the various components of system 100. The AP 112 may communicate via wired and/or wireless communication channels with one or more other electronic devices (not shown) and/or another network, such as the Internet. The AP 112 may be configured to operate according to any of various communications standards, such as the various IEEE 802.11 standards as well as one or more proprietary communication standards, e.g., based on wideband, ultra-wideband, and/or additional short range/low power wireless communication technologies. In some embodiments, at least one client station 106 may be configured to communicate directly with one or more neighboring devices (e.g., other client stations 106, wireless nodes 107, and/or positional tag devices 108), without use of the access point 112 (e.g., peer-to-peer (P2P) or device-to-device (D2D)). As shown, wireless node 107 may be implemented as any of a variety of devices, such as wearable devices, gaming devices, and so forth. In some embodiments, wireless node 107 may be various Internet of Things (IoT) devices, such as smart appliances (e.g., refrigerator, stove, oven, dish washer, clothes washer, clothes dryer, and so forth), smart thermostats, and/or other home automation devices (e.g., such as smart electrical outlets, smart lighting fixtures, and so forth).

As shown, a positional tag device 108 may communicate with one or more other components within system 100. In some embodiments, positional tag device 108 may be associated with a companion device (e.g., a client station 106) and additionally be capable of communicating with one or more additional devices (e.g., other client stations 106, wireless nodes 107, AP 112). In some embodiments, communication with the companion device may be via one or more access technologies/protocols, such as BLUETOOTH (and/or BLUETOOTH (BT) Low Energy (BLE)), Wi-Fi peer-to-peer (e.g., Wi-Fi Direct, Neighbor Awareness Networking (NAN), and so forth), millimeter wave (mmWave) (e.g., 60 GHz, such as 802.11 ad/ay), as well as any of various proprietary protocols (e.g., via wideband or ultra-wideband (UWB) and/or low and/or ultra-low power (LP/ULP) wireless communication). In some embodiments, communication with additional devices may be via BT/BLE as well as one or more other short-range peer-to-peer wireless communication techniques (e.g., various near-field communication (NFC) techniques, RFID, NAN, Wi-Fi Direct, UWB, LT/ULP, and so forth). In some embodiments, positional tag device 108 may be capable of updating a server with a current location (e.g., determined by tag device 108 and/or provided to tag device 108 from another device) via the one or more additional devices as well as via the companion device.

Figure 2A:
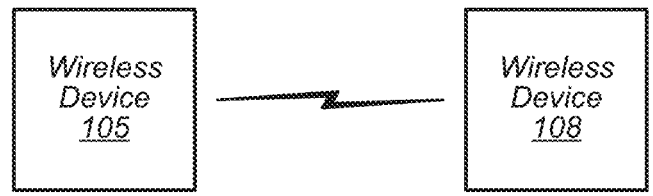
FIG. 2A illustrates an example of wireless devices communicating, according to some embodiments.

FIG. 2A illustrates an exemplary (and simplified) wireless communication system in which aspects of this disclosure may be implemented. It is noted that the system of FIG. 2A is merely one example of a possible system, and embodiments of this disclosure may be implemented in any of various systems, as desired.

As shown, the exemplary wireless communication system includes a ("first") wireless device 105 in communication with another ("second") wireless device 108. The first wireless device 105 and the second wireless device 108 may communicate wirelessly using any of a variety of wireless communication techniques.

As one possibility, the first wireless device 105 and the second wireless device 108 may perform communication using wireless local area networking (WLAN) communication technology (e.g., IEEE 802.11/Wi-Fi based communication) and/or techniques based on WLAN wireless communication. One or both of the wireless device 105 and the wireless device 108 may also (or alternatively) be capable of communicating via one or more additional wireless communication protocols, such as any of BLUETOOTH (BT), BLUETOOTH Low Energy (BLE), near field communication (NFC), RFID, UWB, LP/ULP, GSM, UMTS (WCDMA, TDSCDMA), LTE, LTE-Advanced (LTE-A), NR, 3GPP2 CDMA2000 (e.g., 1×RTT, 1×EV-DO, HRPD, eHRPD), Wi-MAX, GPS, etc.

The wireless devices 105 and 108 may be any of a variety of types of wireless device. As one possibility, wireless device 105 may be a substantially portable wireless user equipment (UE) device, such as a smart phone, hand-held device, a laptop computer, a wearable device (such as a smart watch), a tablet, a motor vehicle, or virtually any type of wireless device. As another possibility, wireless device 105 may be a substantially stationary device, such as a payment kiosk/payment device, point of sale (POS) terminal, set top box, media player (e.g., an audio or audiovisual device), gaming console, desktop computer, appliance, door, access point, base station, or any of a variety of other types of device. The wireless device 108 may be a positional tag device, e.g., in a stand-alone form factor, associated with, attached to, and/or otherwise integrated into another computing device, and/or associated with, attached to, and/or integrated into a personal article or device (e.g., a wallet, a backpack, luggage, a briefcase, a purse, a key ring/chain, personal identification, and so forth) and/or a commercial article (e.g., a shipping container, shipping/storage pallet, an item of inventory, a vehicle, and so forth).

Each of the wireless devices 105 and 108 may include wireless communication circuitry configured to facilitate the performance of wireless communication, which may include various digital and/or analog radio frequency (RF) components, one or more processors configured to execute program instructions stored in memory, one or more programmable hardware elements such as a field-programmable gate array (FPGA), a programmable logic device (PLD), an application specific IC (ASIC), and/or any of various other components. The wireless device 105 and/or the wireless device 108 may perform any of the method embodiments or operations described herein, or any portion of any of the method embodiments or operations described herein, using any or all of such components.

Each of the wireless devices 105 and 108 may include one or more antennas and corresponding radio frequency front-end circuitry for communicating using one or more wireless communication protocols. In some cases, one or more parts of a receive and/or transmit chain may be shared between multiple wireless communication standards; for example, a device might be configured to communicate using BT/BLE or Wi-Fi using partially or entirely shared wireless communication circuitry (e.g., using a shared radio or one or more shared radio components). The shared communication circuitry may include a single antenna, or may include multiple antennas (e.g., for MIMO) for performing wireless communications. Alternatively, a device may include separate transmit and/or receive chains (e.g., including separate antennas and other radio components) for each wireless communication protocol with which it is configured to communicate. As a further possibility, a device may include one or more radios or radio components that are shared between multiple wireless communication protocols, and one or more radios or radio components that are used exclusively by a single wireless communication protocol. For example, a device might include a shared radio for communicating using one or more of LTE, CDMA2000 1×RTT, GSM, and/or 5G NR, and one or more separate radios for communicating using Wi-Fi and/or BT/BLE. Other configurations are also possible.

As previously noted, aspects of this disclosure may be implemented in conjunction with the wireless communication system of FIG. 2A. For example, a wireless device (e.g., either of wireless devices 105 or 108) may be configured to implement (and/or assist in implementation of) the methods described herein.

Figure 2B:
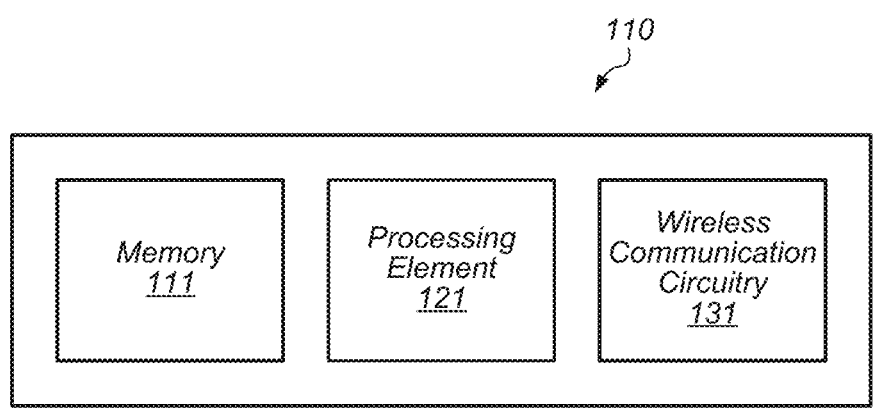
FIG. 2B illustrates an example simplified block diagram of a wireless device, according to some embodiments.

FIG. 2B illustrates an exemplary wireless device 110 (e.g., corresponding to wireless devices 105 and/or 108) that may be configured for use in conjunction with various aspects of the present disclosure. The device 110 may be any of a variety of types of device and may be configured to perform any of a variety of types of functionality. The device 110 may be a substantially portable device or may be a substantially stationary device, potentially including any of a variety of types of device. The device 110 may be configured to perform any of the techniques or features illustrated and/or described herein, including with respect to any or all of the Figures.

As shown, the device 110 may include a processing element 121. The processing element may include or be coupled to one or more memory elements. For example, the device 110 may include one or more memory media (e.g., memory 111), which may include any of a variety of types of memory and may serve any of a variety of functions. For example, memory 111 could be RAM serving as a system memory for processing element 121. Additionally or alternatively, memory 111 could be ROM serving as a configuration memory for device 110. Other types and functions of memory are also possible.

Additionally, the device 110 may include wireless communication circuitry 131. The wireless communication circuitry may include any of a variety of communication elements (e.g., antenna for wireless communication, analog and/or digital communication circuitry/controllers, etc.) and may enable the device to wirelessly communicate using one or more wireless communication protocols.

Note that in some cases, the wireless communication circuitry 131 may include its own processing element(s) (e.g., a baseband processor), e.g., in addition to the processing element 121. For example, the processing element 121 may be an 'application processor' whose primary function may be to support application layer operations in the device 110, while the wireless communication circuitry 131 may be a 'baseband processor' whose primary function may be to support baseband layer operations (e.g., to facilitate wireless communication between the device 110 and other devices) in the device 110. In other words, in some cases the device 110 may include multiple processing elements (e.g., may be a multi-processor device). Other configurations (e.g., instead of or in addition to an application processor/baseband processor configuration) utilizing a multi-processor architecture are also possible.

The device 110 may additionally include any of a variety of other components (not shown) for implementing device functionality, depending on the intended functionality of the device 110, which may include further processing and/or memory elements (e.g., audio processing circuitry), one or more power supply elements (which may rely on battery power and/or an external power source) user interface elements (e.g., display, speaker, microphone, camera, keyboard, mouse, touchscreen, etc.), and/or any of various other components.

The components of the device 110, such as processing element 121, memory 111, and wireless communication circuitry 131, may be operatively (or communicatively) coupled via one or more interconnection interfaces, which may include any of a variety of types of interface, possibly including a combination of multiple types of interfaces. As one example, a USB high-speed inter-chip (HSIC) interface may be provided for inter-chip communications between processing elements. Alternatively (or in addition), a universal asynchronous receiver transmitter (UART) interface, a serial peripheral interface (SPI), inter-integrated circuit (I2C), system management bus (SMBus), and/or any of a variety of other communication interfaces may be used for communications between various device components. Other types of interfaces (e.g., intra-chip interfaces for communication within processing element 121, peripheral interfaces for communication with peripheral components within or external to device 110, etc.) may also be provided as part of device 110.

Figure 2C:
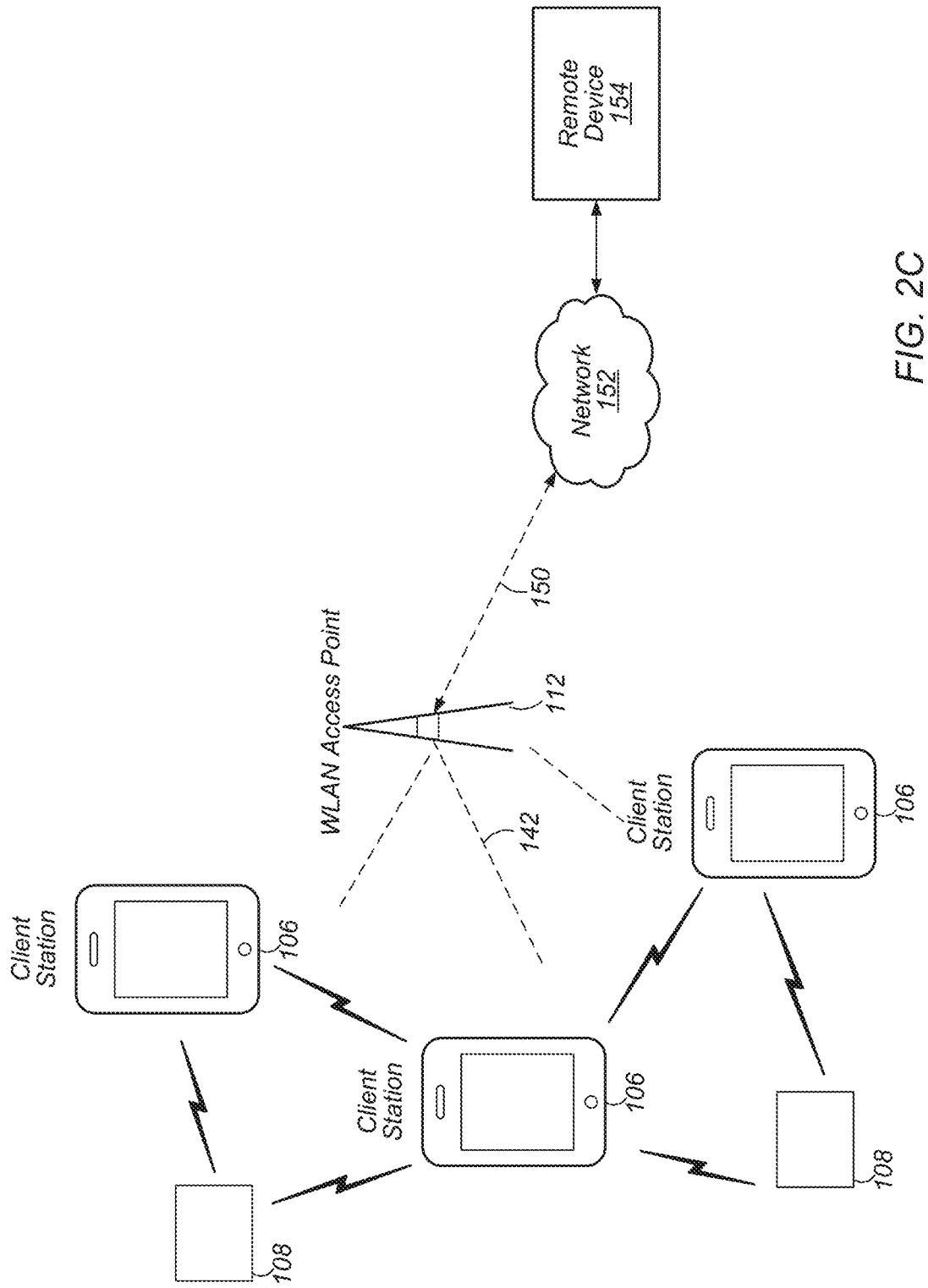
FIG. 2C illustrates an example WLAN communication system, according to some embodiments.

FIG. 2C illustrates an example WLAN system according to some embodiments. As shown, the exemplary WLAN system includes a plurality of wireless client stations or devices, or user equipment (UEs), 106 that are configured to communicate over a wireless communication channel 142 with an Access Point (AP) 112. In some embodiments, the AP 112 may be a Wi-Fi access point. The AP 112 may communicate via wired and/or wireless communication channel(s) 150 with one or more other electronic devices (not shown) and/or another network 152, such as the Internet. Additional electronic devices, such as the remote device 154, may communicate with components of the WLAN system via the network 152. For example, the remote device 154 may be another wireless client station. The WLAN system may be configured to operate according to any of various communications standards, such as the various IEEE 802.11 standards. In some embodiments, at least one wireless device 106 is configured to communicate directly with one or more neighboring mobile devices, such as positional tag devices 108, without use of the access point 112.

Further, in some embodiments, as further described below, a wireless device 106 (which may be an exemplary implementation of device 110) may be configured to perform (and/or assist in performance of) the methods described herein.

Figure 3A:
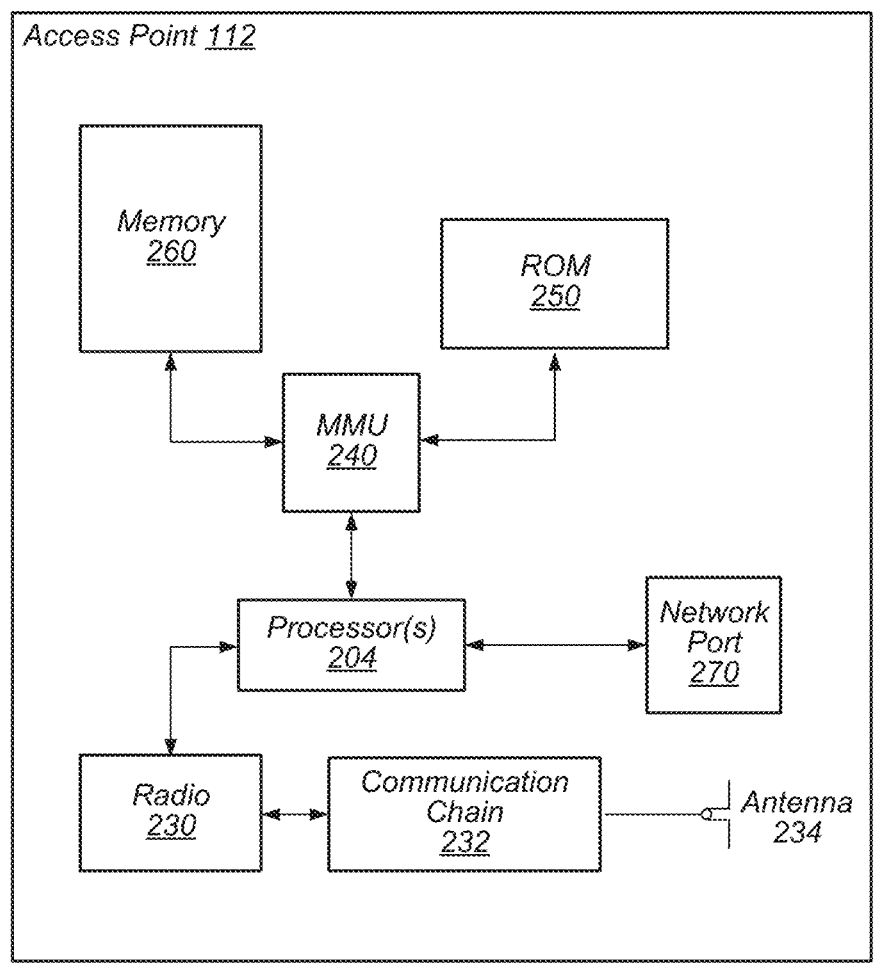
FIG. 3A illustrates an example simplified block diagram of a WLAN Access Point (AP), according to some embodiments.

FIG. 3A illustrates an exemplary block diagram of an access point (AP) 112, which may be one possible exemplary implementation of the device 110 illustrated in FIG. 2B. It is noted that the block diagram of the AP of FIG. 3A is only one example of a possible system. As shown, the AP 112 may include processor(s) 204, which may execute program instructions for the AP 112. The processor(s) 204 may also be coupled (directly or indirectly) to memory management unit (MMU) 240, which may be configured to receive addresses from the processor(s) 204 and to translate those addresses into locations in memory (e.g., memory 260 and read only memory (ROM) 250) or to other circuits or devices.

The AP 112 may include at least one network port 270. The network port 270 may be configured to couple to a wired network and provide a plurality of devices, such as mobile devices 106, access to the Internet. For example, the network port 270 (or an additional network port) may be configured to couple to a local network, such as a home network or an enterprise network. For example, port 270 may be an Ethernet port. The local network may provide connectivity to one or more additional networks, such as the Internet.

The AP 112 may include at least one antenna 234 and wireless communication circuitry 230, which may be configured to operate as a wireless transceiver and may be further configured to communicate with mobile device 106 (as well as positional tag device 108). The antenna 234 communicates with the wireless communication circuitry 230 via communication chain 232. Communication chain 232 may include one or more receive chains and/or one or more transmit chains. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, BT/BLE, UWB, and/or LP/ULP. Further, in some embodiments, the wireless communication circuitry 230 may also, or alternatively, be configured to communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

Further, in some embodiments, as further described below, AP 112 may be configured to perform (and/or assist in performance of) the methods described herein.

Figure 3B:
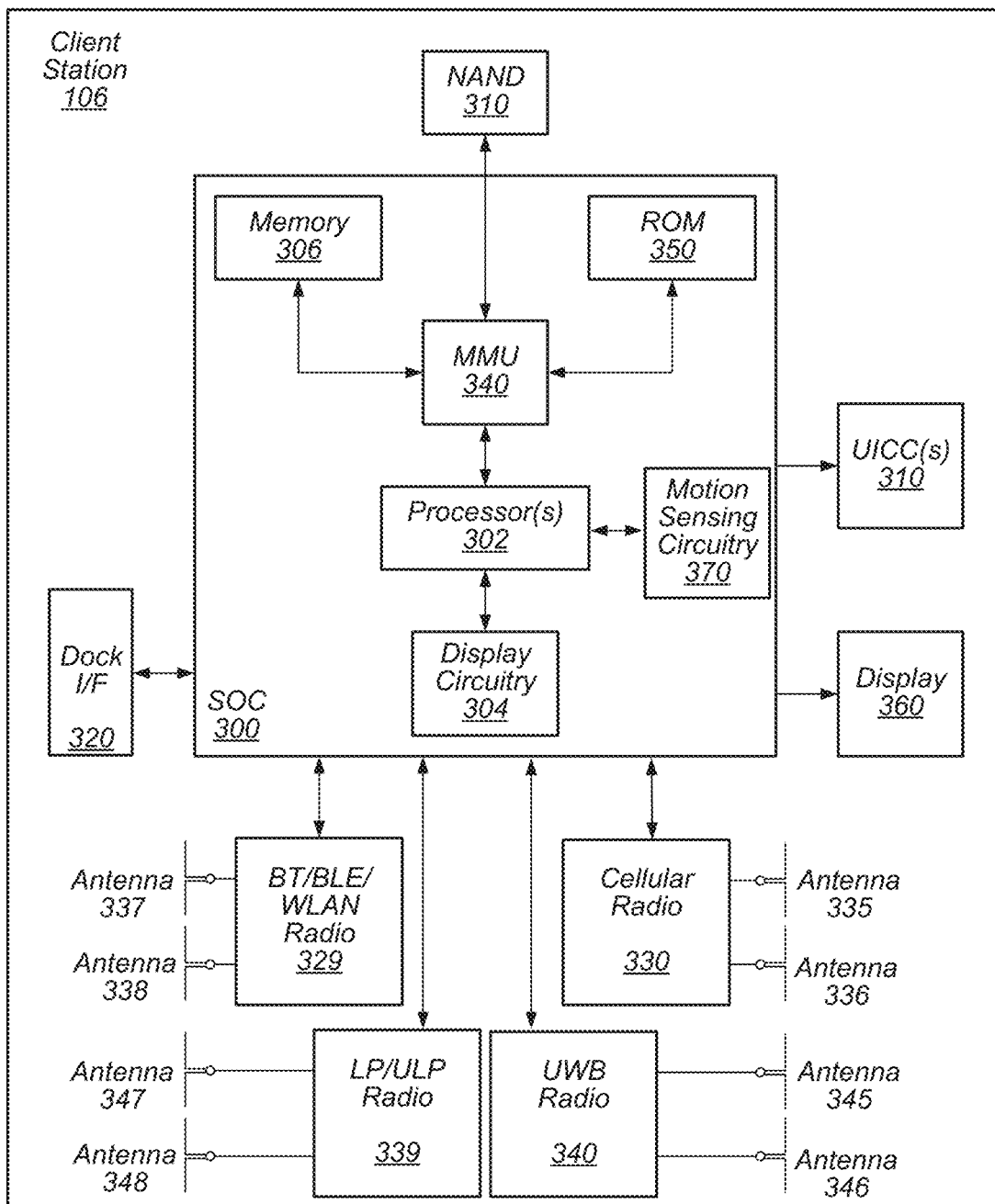
FIG. 3B illustrates an example simplified block diagram of a wireless station (UE), according to some embodiments.

FIG. 3B illustrates an example simplified block diagram of a client station 106, which may be one possible exemplary implementation of the device 110 illustrated in FIG. 2B. According to embodiments, client station 106 may be a user equipment (UE) device, a mobile device or mobile station, and/or a wireless device or wireless station. As shown, the client station 106 may include a system on chip (SOC) 300, which may include portions for various purposes. The SOC 300 may be coupled to various other circuits of the client station 106. For example, the client station 106 may include various types of memory (e.g., including NAND flash memory 310), a connector interface (I/F) (or dock) 320 (e.g., for coupling to a computer system, dock, charging station, etc.), the display 360, cellular communication circuitry 330 such as for LTE, GSM, etc., short to medium range wireless communication circuitry 329 (e.g., Bluetooth™ and WLAN circuitry), low power/ultra-low power (LP/ULP) radio 339, and ultra-wideband radio 341. The client station 106 may further include one or more smart cards 310 that incorporate SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. LP/ULP radio 339 may couple to one or more antennas, such as antennas 347 and 348 as shown. Additionally, UWB radio 341 may couple to one or more antennas, such as antennas 345 and 346. Alternatively, the radios may share one or more antennas in addition to, or instead of, coupling to respective antennas or respective sets of antennas. Any or all of the radios may include multiple receive chains and/or multiple transmit chains for receiving and/or transmitting multiple spatial streams, such as in a multiple-input multiple output (MIMO) configuration.

As shown, the SOC 300 may include processor(s) 302, which may execute program instructions for the client station 106 and display circuitry 304, which may perform graphics processing and provide display signals to the display 360. The SOC 300 may also include motion sensing circuitry 370, which may detect motion of the client station 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses into locations in memory (e.g., memory 306, read only memory (ROM) 350, NAND flash memory 310) and/or to other circuits or devices, such as the display circuitry 304, cellular communication circuitry 330, short range wireless communication circuitry 329, LP/ULP communication circuitry 339, UWB communication circuitry 341, connector interface (I/F) 320, and/or display 360. The MMU 340 may be configured to perform memory protection and page table translation or set up. In some embodiments, the MMU 340 may be included as a portion of the processor(s) 302.

As noted above, the client station 106 may be configured to communicate wirelessly directly with one or more neighboring client stations and/or one or more positional tag devices 108. The client station 106 may be configured to communicate according to a WLAN RAT for communication in a WLAN network, such as that shown in FIG. 2C. Further, in some embodiments, as further described below, client station 106 may be configured to perform (and/or assist in performance of) the methods described herein.

As described herein, the client station 106 may include hardware and/or software components for implementing the features described herein. For example, the processor 302 of the client station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 329, 330, 335, 336, 337, 338, 339, 340, 341, 345, 346, 347, 348, 350, and/or 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 204.

Further, as described herein, cellular communication circuitry 330 and short-range wireless communication circuitry 329 may each include one or more processing elements. Thus, each of cellular communication circuitry 330 and short-range wireless communication circuitry 329 may include one or more integrated circuits (ICs) configured to perform the functions of cellular communication circuitry 330 and short-range wireless communication circuitry 329, respectively.

Figure 3C:
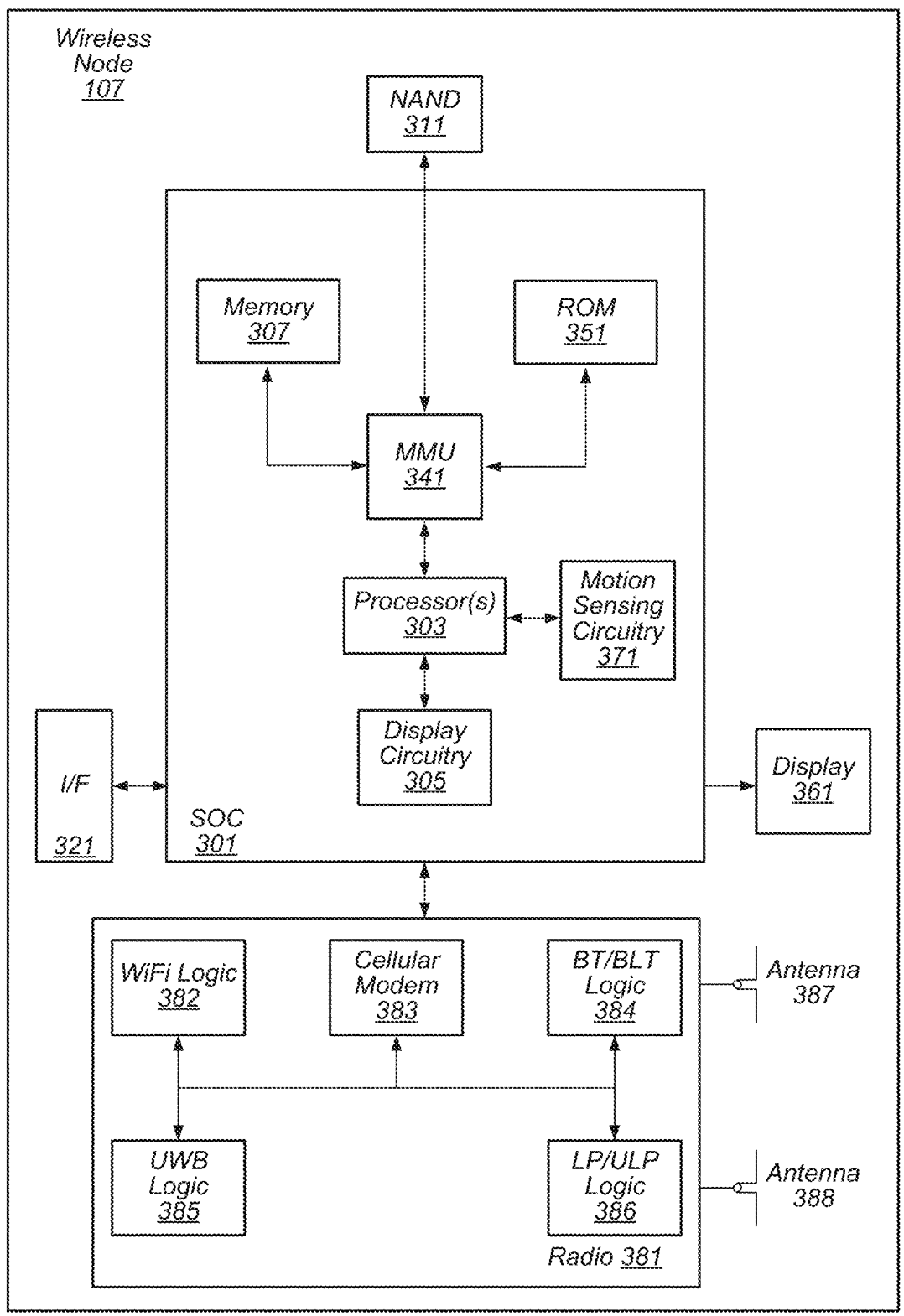
FIG. 3C illustrates an example simplified block diagram of a wireless node, according to some embodiments.

FIG. 3C illustrates one possible block diagram of a wireless node 107, which may be one possible exemplary implementation of the device 110 illustrated in FIG. 2B. As shown, the wireless node 107 may include a system on chip (SOC) 301, which may include portions for various purposes. For example, as shown, the SOC 301 may include processor(s) 303 which may execute program instructions for the wireless node 107, and display circuitry 305 which may perform graphics processing and provide display signals to the display 361. The SOC 301 may also include motion sensing circuitry 371 which may detect motion of the wireless node 107, for example using a gyroscope, accelerometer, and/or any of various other motion sensing components. The processor(s) 303 may also be coupled to memory management unit (MMU) 341, which may be configured to receive addresses from the processor(s) 303 and translate those addresses to locations in memory (e.g., memory 307, read only memory (ROM) 351, flash memory 311). The MMU 341 may be configured to perform memory protection and page table translation or set up. In some embodiments, the MMU 341 may be included as a portion of the processor(s) 303.

As shown, the SOC 301 may be coupled to various other circuits of the wireless node 107. For example, the wireless node 107 may include various types of memory (e.g., including NAND flash memory 311), a connector interface 321 (e.g., for coupling to a computer system, dock, charging station, etc.), the display 361, and wireless communication circuitry (radio) 381 (e.g., for LTE, LTE-A, CDMA2000, Bluetooth, Wi-Fi, NFC, GPS, UWB, LP/ULP, etc.).

The wireless node 107 may include at least one antenna, and in some embodiments, multiple antennas 387 and 388, for performing wireless communication with base stations and/or other devices. For example, the wireless node 107 may use antennas 387 and 388 to perform the wireless communication. As noted above, the wireless node 107 may in some embodiments be configured to communicate wirelessly using a plurality of wireless communication standards or radio access technologies (RATs).

The wireless communication circuitry (radio) 381 may include Wi-Fi Logic 382, a Cellular Modem 383, BT/BLE Logic 384, UWB logic 385, and LP/ULP logic 386. The Wi-Fi Logic 382 is for enabling the wireless node 107 to perform Wi-Fi communications, e.g., on an 802.11 network and/or via peer-to-peer communications (e.g., NAN). The BT/BLE Logic 384 is for enabling the wireless node 107 to perform Bluetooth communications. The cellular modem 383 may be capable of performing cellular communication according to one or more cellular communication technologies. The UWB logic 385 is for enabling the wireless node 107 to perform UWB communications. The LP/ULP logic 386 is for enabling the wireless node 107 to perform LP/ULP communications. Some or all components of the wireless communication circuitry 381 may be used for communications with a positional tag device 108.

As described herein, wireless node 107 may include hardware and software components for implementing embodiments of this disclosure. For example, one or more components of the wireless communication circuitry 381 of the wireless node 107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit). For example, in some embodiments, as further described below, wireless node 107 may be configured to perform (and/or assist in the performance of) the methods described herein.

Figure 4:
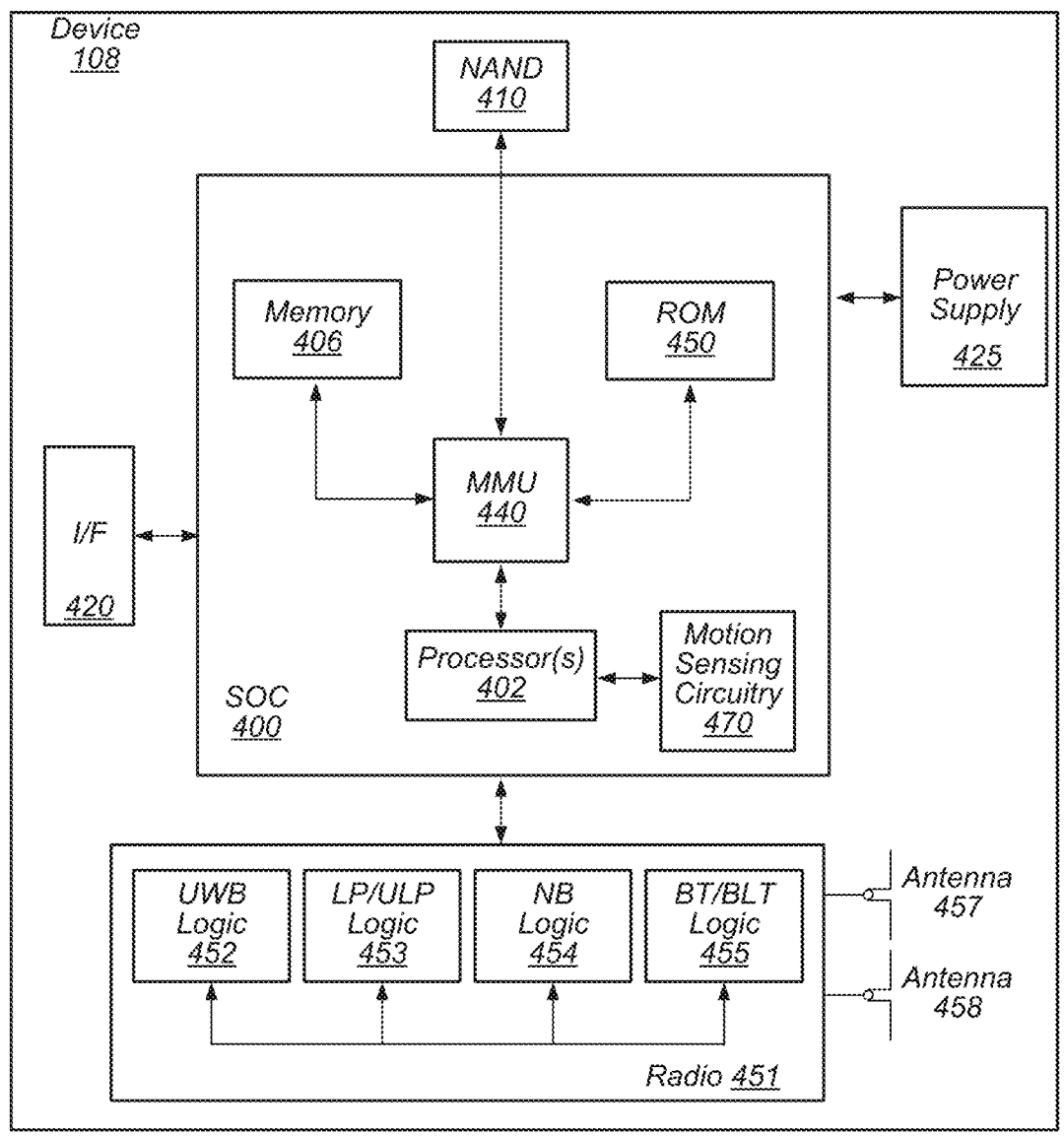
FIG. 4 illustrates an example simplified block diagram of a positional tag device, according to some embodiments.

FIG. 4 illustrates an example simplified block diagram of a positional tag (e.g., a multiple interface transponder (MIT)) device 108, which may be one possible exemplary implementation of the device 110 illustrated in FIG. 2B. According to embodiments, positional tag device 108 may include a system on chip (SOC) 400, which may include one or more portions for performing one or more purposes (or functions or operations). The SOC 400 may be coupled to one or more other circuits of the positional tag device 108. For example, the positional tag device 108 may include various types of memory (e.g., including NAND flash 410), a connector interface (I/F) 420 (e.g., for coupling to a computer system, dock, charging station, light (e.g., for visual output), speaker (e.g., for audible output), etc.), a power supply 425 (which may be non-removable, removable and replaceable, and/or rechargeable), and communication circuitry (radio) 451 (e.g., BT/BLE, WLAN, LP/ULP, UWB).

The positional tag device 108 may include at least one antenna, and in some embodiments, multiple antennas 457 and 458, for performing wireless communication with a companion device (e.g., client station 106, wireless node 107, AP 112, and so forth) as well as other wireless devices (e.g., client station 106, wireless node 107, AP 112, other positional tag devices 108, and so forth). In some embodiments, one or more antennas may be dedicated for use with a single radio and/or radio protocol. In some other embodiments, one or more antennas may be shared across two or more radios and/or radio protocols. The wireless communication circuitry 451 may include any/all of UWB logic 452, LP/ULP logic 453, narrowband (NB) logic 454, and/or BT/BLE logic 455. In some embodiments, wireless communication circuitry may optionally include logic for any other protocol(s), such as Wi-Fi logic and/or a cellular (e.g., License Assisted Access (LAA)) logic. The BT/BLE logic 455 is for enabling the positional tag device 108 to perform Bluetooth communications. The UWB logic 452 is for enabling the positional tag device 108 to perform UWB communications. The LP/ULP logic 453 is for enabling the positional tag device 108 to perform LP/ULP communications. The NB logic 454 is for the positional tag device 108 to access narrowband channels, e.g., such as for arbitration, coordination, and/or reservation of a UWB channel as further described herein. In some embodiments, the wireless communication circuitry 451 may include multiple receive chains and/or multiple transmit chains for receiving and/or transmitting multiple spatial streams, such as in a multiple-input multiple output (MIMO) configuration. The UWB logic 452, LP/ULP logic 453, NB logic 454, and BT/BLE logic 455 each may be independently configured to perform unidirectional or bidirectional communication.

As shown, the SOC 400 may include processor(s) 402, which may execute program instructions for the positional tag device 108. The SOC 400 may also include motion sensing circuitry 470, which may be configured to detect motion of the positional tag device 108, for example using a gyroscope, accelerometer, and/or any of various other motion sensing components. In some embodiments, a GPS receiver and associated circuitry may be used in addition to or in place of other motion sensing circuitry. The processor(s) 402 may also be coupled (directly or indirectly) to memory management unit (MMU) 440, which may be configured to receive addresses from the processor(s) 402 and translate those addresses into locations in memory (e.g., memory 406, read only memory (ROM) 450, NAND flash memory 410) and/or to other circuits or devices, such as the wireless communication circuitry 451. The MMU 440 may be configured to perform memory protection and page table translation or set up. In some embodiments, the MMU 440 may be included as a portion of the processor(s) 402.

As noted above, the positional tag device 108 may be configured to communicate wirelessly with one or more neighboring wireless devices. In some embodiments, as further described below, positional tag device 108 may be configured to perform (and/or assist in the performance of) the methods described herein.

UWB Channel Access Scheme

Embodiments described herein relate to systems, methods, and mechanisms for an out-of-band (OOB) ultra-wide band (UWB) channel arbitration and/or channel coordination scheme, e.g., embodiments described herein define arbitration, coordination, and/or access schemes via a channel in a non-UWB frequency band and over a radio other than a UWB radio. For example, a wireless station, e.g., such as wireless station 106, device 110, and/or access point 112, may participate in a peer-to-peer (P2P) data communication over an ultra-wide band (UWB) channel with another wireless station, e.g., such as another wireless station 106, device 110, and/or access point 112. The wireless station may perform arbitration of the UWB channel on an arbitration channel (e.g., on an OOB channel). Further, post successful arbitration, the wireless station may claim the UWB channel for a duration of a transmission (or transmit) opportunity. As another example, a wireless station, e.g., such as wireless station 106, device 110, and/or access point 112, may participate in a peer-to-peer (P2P) data communication over an ultra-wide band (UWB) channel with another wireless station, e.g., such as another wireless station 106, device 110, and/or access point 112. The wireless station may perform coordination of the UWB channel on an advertisement channel (e.g., on an OOB channel). Further, post successful coordination of the UWB channel, the wireless station may claim the UWB channel for a duration of a transmission (or transmit) opportunity. As a further example, a wireless station, e.g., such as wireless station 106, device 110, and/or access point 112, may participate in a peer-to-peer (P2P) data communication over an ultra-wide band (UWB) channel with another wireless station, e.g., such as another wireless station 106, device 110, and/or access point 112. The wireless station may access the UWB channel based on periodic advertisements transmitted on an advertisement channel (e.g., on an OOB channel). Further, post advertisement, the wireless station may claim the UWB channel for a duration of a transmission (or transmit) opportunity.

In some instances, within a P2P group (e.g., a pairing of two or more wireless devices for P2P communications) for UWB communications, transmissions and receptions (e.g., communications) may be time synchronized via an arbitration channel, e.g., one of the wireless devices may govern a synchronization time value for the P2P group. In addition, P2P groups in proximity of one another may be synchronized in time to one another. Further, in some instances, a request to send (RTS) frame and/or a clear to send (CTS) frame may carry (include) the synchronization time value (e.g., SyncTime value). The synchronization time value may be 8 bytes within the RTS frame and/or the CTS frame. In addition, prior to a wireless device's first transmission, the wireless device may be required to perform a scan of the arbitration channel for a least a time period. The time period may be at least as long as a transmit opportunity on the UWB channel. The scan may act as a channel access procedure. For example, the wireless device may listen for RTS and/or CTS frames for the time period. Note that in addition to carrying the synchronization time value, the RTS and/or CTS frames may also carry a subsequent (e.g., next) arbitration event epoch (e.g., time). In some instances, if no RTS and/or CTS frame is heard (e.g., received) (e.g., if the arbitration channel is not busy, clear, unoccupied, and/or not in use), then the wireless station may transmit an RTS and/or CTS frame on the arbitration channel (e.g., to reserve the UWB channel) followed by UWB communications on the UWB channel. In some instances, if an RTS and/or CTS frame is heard (e.g., received) (e.g., if the arbitration channel is busy, not clear, occupied, and/or in use), the wireless device may set a local synchronization time value and arbitrate for UWB channel access at the next arbitration event (e.g., as indicated by the RTS and/or CTS frame). Note that if a synchronization time value in the RTS and/or CTS frame is later than the local synchronization time value, then the wireless device may set the local synchronization time value to the synchronization time value carried in the RTS and/or CTS frame. Note further that if a synchronization time value in the RTS and/or CTS frame is earlier than the local synchronization time value, then the wireless device may keep the local synchronization time value.

In some instances, arbitration for UWB channel access may include the wireless device performing, e.g., at each arbitration even, clear channel access (CCA) energy detection (ED) of the arbitration channel for a duration of time, e.g., for a random and/or pseudorandom duration of time between 0 and X microseconds. Note that if the CCA-Ed is determined to be above (e.g., greater than or equal to) a threshold (e.g., such as −75 dBm/MHz) and/or if an RTS and/or CTS frame is received during the duration of time, then the wireless device may assume the UWB Channel is busy, not clear, occupied, and/or in use. Otherwise, the wireless device may transmit on the UWB Channel for transmit opportunity duration. Note further that an RTS and/or CTS frame duration, an inter-frame space between an RTS and/or CTS frame, a transmit opportunity duration, and X may be defined by a standard and/or known a priori. Note that in lieu of a fixed transmit opportunity duration, an RTS and/or CTS frame may carry a UWB physical layer protocol data unit (PPDU) duration, e.g., for better UWB channel utilization.

Note that an RTS and/or CTS frame in a UWB channel arbitration procedure may increase a radio frequency coverage area thereby blocking farther away P2P group transmissions. Thus, omitting RTS and/or CTS frames from the UWB channel arbitration procedure may improve spatial reuse of UWB channel by P2P groups.

Thus, in some embodiments, P2P groups may coordinate with one another for multiplexed access to a UWB channel. For example, RTS and/or CTS frames may indicate a P2P group identifier (groupID) and transmit opportunity sub-slot for transmission in a current transmit opportunity. As another example, RTS and/or CTS frames may indicate a P2P groupID and a frequency offset from a center frequency for transmission in a current transmit opportunity. In some instances, a CTS frame may copy information, e.g., such as groupID and/or resource allocation from an RTS frame. In such a scheme, P2P groups may learn about one another's groupID by virtue of hearing RTS and/or CTS frames. In some instances, management packets may be exchanged between P2P group devices to relay such information.

In some instances, the arbitration channel may be a narrowband (NB) channel, e.g., a NB arbitration channel such as a NB advertisement channel. In such instances, there may be no synchronization between neighboring narrowband networks and UWB networks. Thus, the arbitration (or coordination) procedure may be applicable to only those narrowband-UWB networks that operate on the NB advertisement channel. Note further that such a Coordination procedure may not overly suppress UWB channel access.

Figure 5:
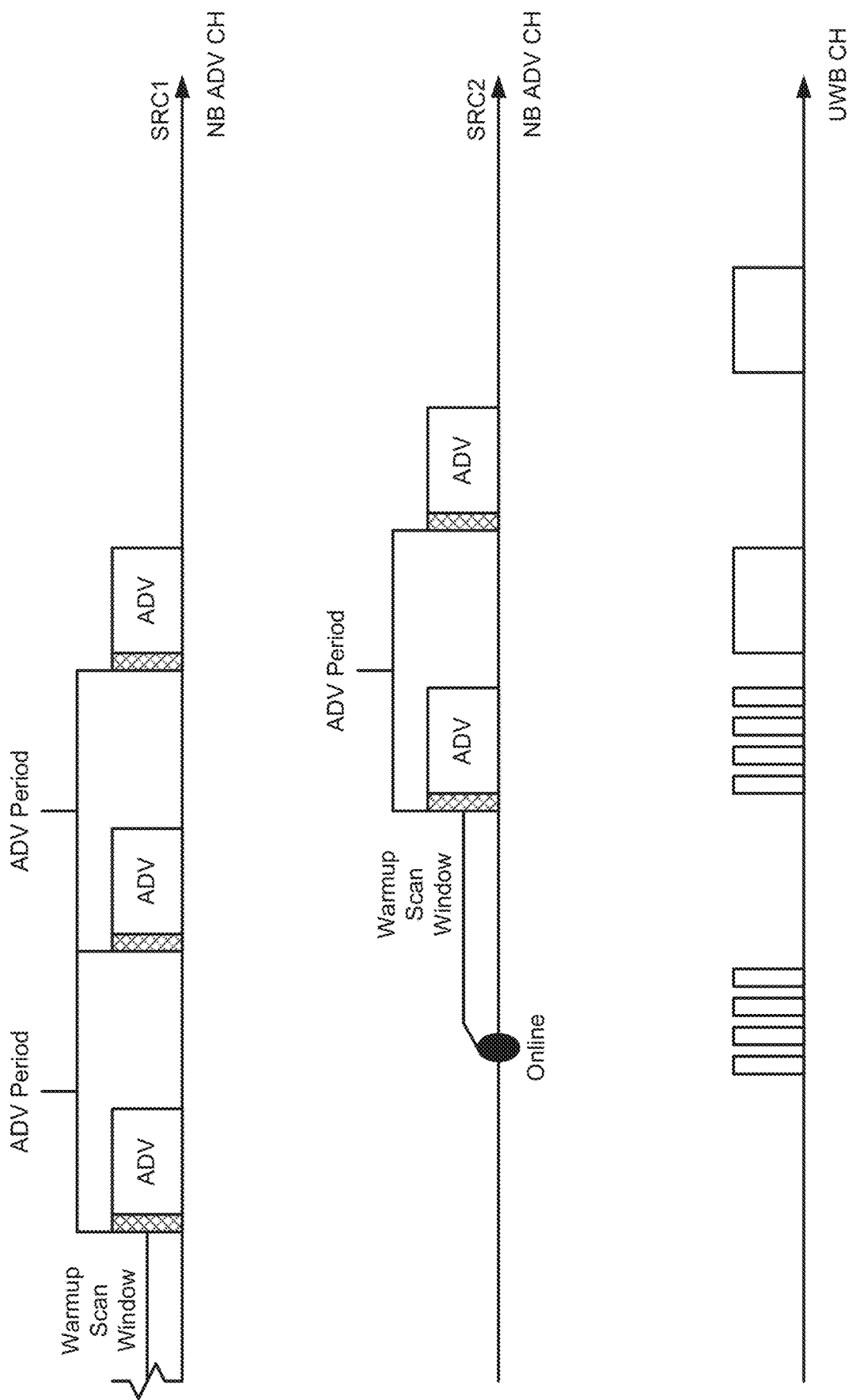
FIG. 5 illustrates an example of periodic advertisement of ultra-wide band (UWB) channel occupancy on an out-of-band (OOB) advertisement channel, according to some embodiments.

In some instances, a wireless device, e.g., such as wireless station 106, device 110, and/or access point 112, may periodically transmit an advertisement on a narrowband advertisement channel to coordinate UWB channel access. Note that the narrowband advertisement, since it is periodic, may not precede each UWB channel access. For example, as illustrated by FIG. 5, a source node (e.g., SRC1), which may be a wireless station, e.g., such as wireless station 106, device 110, and/or access point 112, may transmit an advertisement on a narrowband advertisement channel periodically, e.g., every 96 milliseconds. The advertisement may indicate a UWB channel usage pattern, e.g., UWB transmission start time offset, UWB transmission duration, UWB transmission interval and/or information to determine UWB transmission interval, and/or UWB transmission type (MMS/non-MMS). In addition, prior to transmitting the advertisement, the source node may discover neighboring NB-UWB networks by scanning at least once for a warm-up scan window. The warm-up scan window may be greater than or equal to an advertisement periodicity. As shown, the source node may perform CCA-ED prior to transmitting the advertisement. Based on the CCA-ED, if the advertisement channel is determined to be busy (e.g., occupied and/or in use), then the source node may defer access to the UWB channel until at least a next advertisement period. However, if based on the CCA-ED, if the advertisement channel is determined to be idle (e.g., not occupied and/or not in use), then the source node may transmit the advertisement. Note that if a source node fails to send an advertisement during an advertisement period (e.g., after an initial warm-up scan), the source node may not be required to forgo an upcoming UWB channel access.

Figure 6:
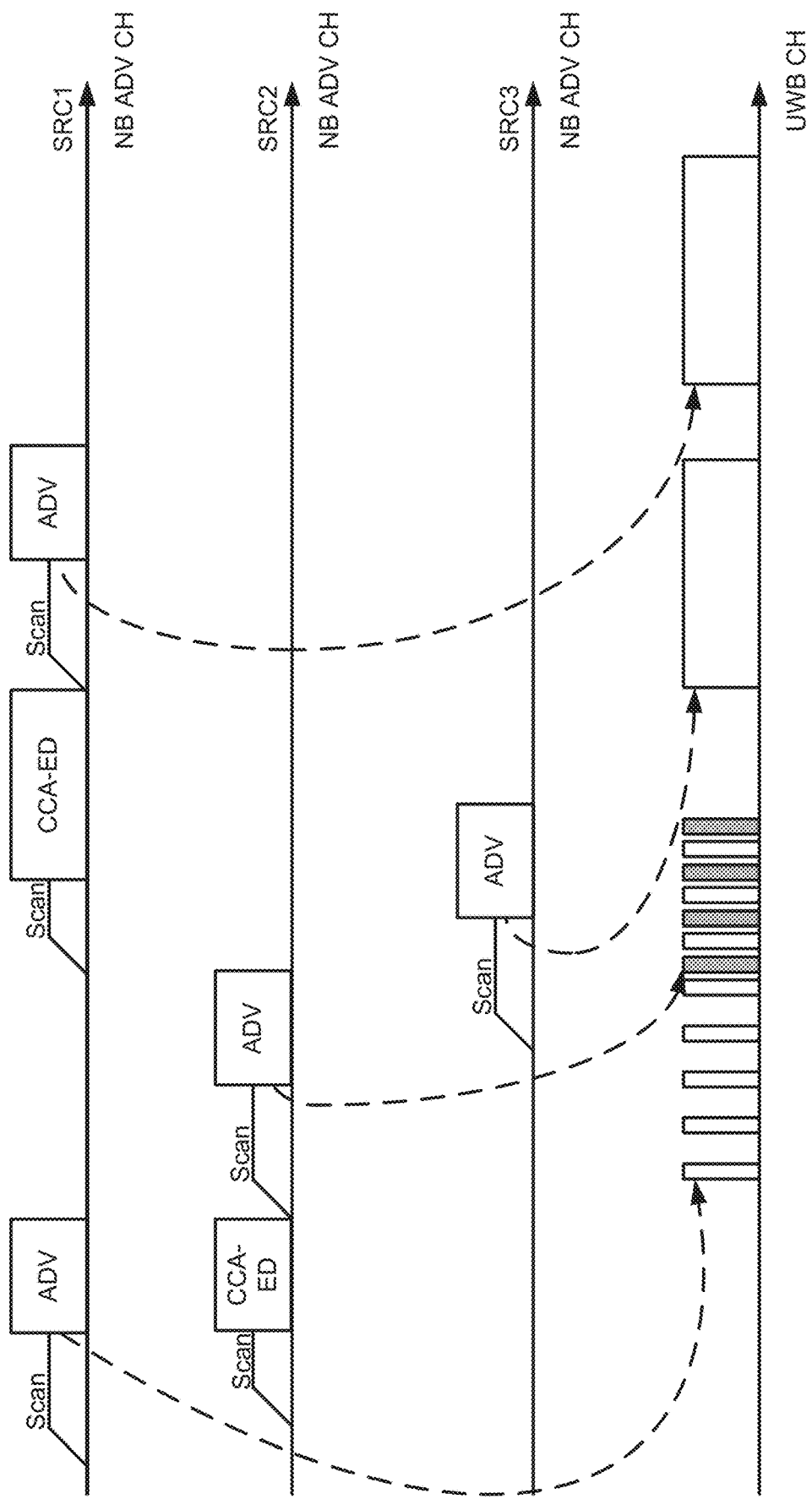
FIG. 6 illustrates an example of advertisement of UWB channel occupancy on an OOB advertisement channel, according to some embodiments.

In some instances, a wireless device, e.g., such as wireless station 106, device 110, and/or access point 112, may opportunistically transmit an advertisement on a narrowband advertisement channel to coordinate UWB channel access. Note that the narrowband advertisement may proceed each UWB channel access. For example, as illustrated by FIG. 6, a source node (e.g., SRC1), which may be a wireless station 106, may scan a narrowband advertisement channel for at least a scan window. Then, if a clear channel access (CCA) energy detection (ED) value is less than a threshold until expiration of the scan window, then the source node may transmit an advertisement on the narrowband channel and follow the advertisement with one or more UWB transmission(s). In some instances, the advertisement may include a UWB transmit start time offset, a UWB transmission duration, and/or a UWB transmission type (e.g., multi-milli-second message (MMS) and/or non-MMS). However, if the CCA ED value is greater than or equal to the threshold at some point during the scan window and/or if an advertisement is received during the scan window, then the source node may defer UWB access for at least an advertisement duration before reattempting access. In some instances, the source node may SRC node may increase its scan window and/or deferral duration on the narrowband advertisement channel, e.g., based on a UWB frame failure ratio. In some instances, an advertisement frame may include dummy fields to increase advertisement frame duration thereby increasing chances that a neighboring device senses the advertisement. Note, however, such a scheme may cause over suppression of the UWB channel.

Figure 7:
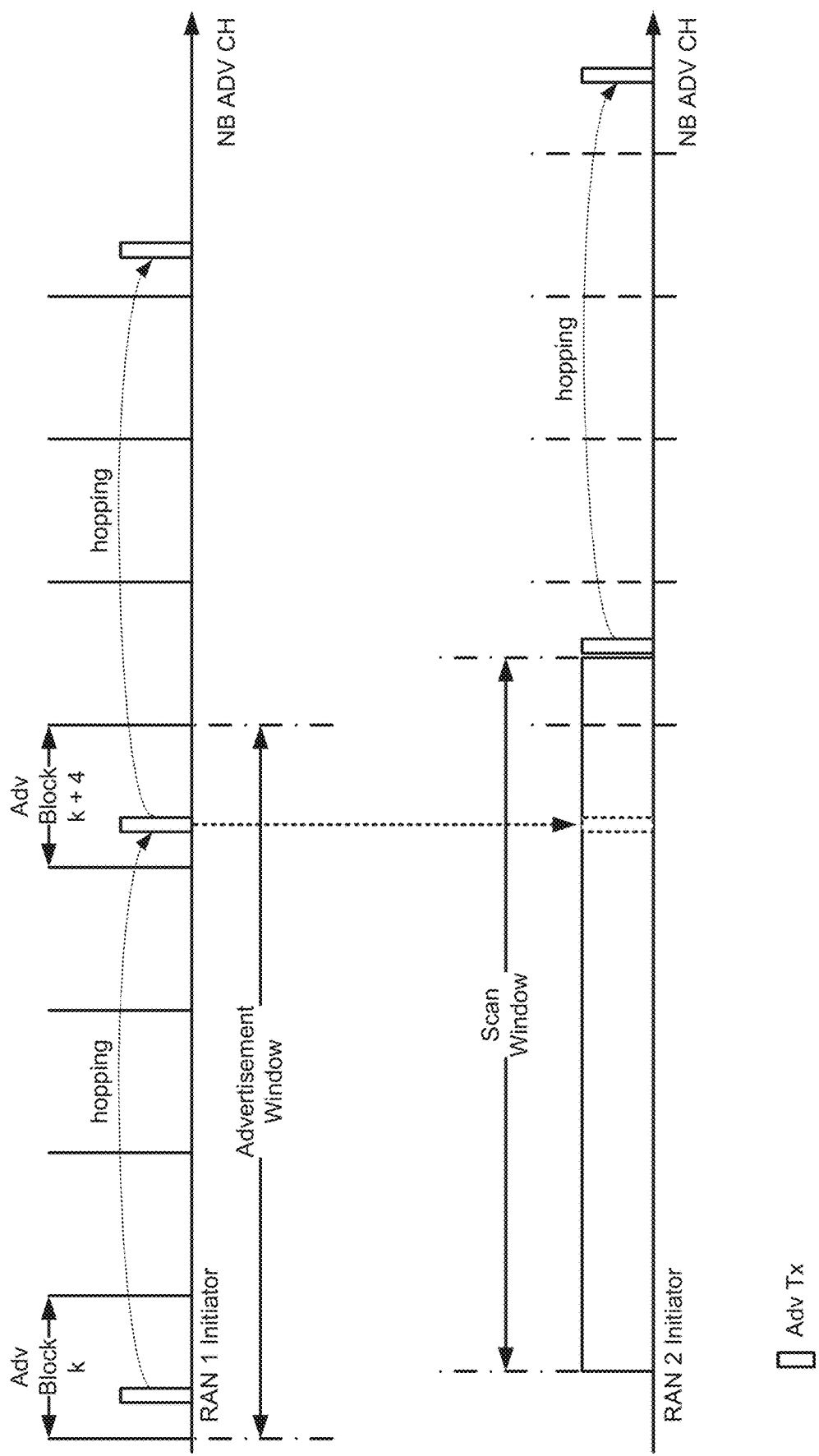
FIG. 7 illustrates an example of ranging area network (RAN) coordination for accessing an UWB channel using an OOB advertisement channel, according to some embodiments.

In some instances, the advertisement may be a legacy 802.15.4z block based medium access control (MAC) frame for narrowband. Thus, advertising packets may be arranged into a fixed, predefined MAC grid, e.g., an atomic advertising block (e.g., 24 ms) with e.g., 24 advertising rounds (1 ms). Further, the advertisement scheme may use a fixed, predefined hopping function and a fixed, predefined hopping seed to minimize overhead in advertising payloads. Additionally, nodes (e.g., such as wireless station 106) may skip three-fourths of the advertising blocks to balance power and discovery time. In addition, nodes new to a neighborhood and/or group may scan one or more advertising channels for at least 120 milliseconds before commencing transmission. Note that in such a scheme, discovery of other devices may be guaranteed in at most 120 milliseconds, e.g., under ideal channel conditions. For example, as illustrated by FIG. 7, a device (e.g., involved in ranging area network (RAN) 2, such as RAN 2 initiator) joining a RAN, such as RAN 1, may scan an advertisement channel for at most 120 milliseconds to discover a RAN 1 initiator. In other words, upon scanning the advertisement channel, a RAN 2 initiator may receive an advertisement from RAN 1 initiator. The advertisement (packet) may include RAN 1 initiator's current local timestamp for the purpose of synchronization or equivalently the advertising block index, k. Then, using the predefined hoping function and hopping seed, the RAN 2 initiator may synchronize with the RAN 1 initiator, e.g., based on k and a recorded receive time of the advertisement packet. The RAN 2 initiator may then begin to advertise on the advertisement channel using a randomly picked time offset from the RAN 1 initiator. In this manner, UWB channel access between RAN 1 and RAN 2 may not collide.

Figure 8:
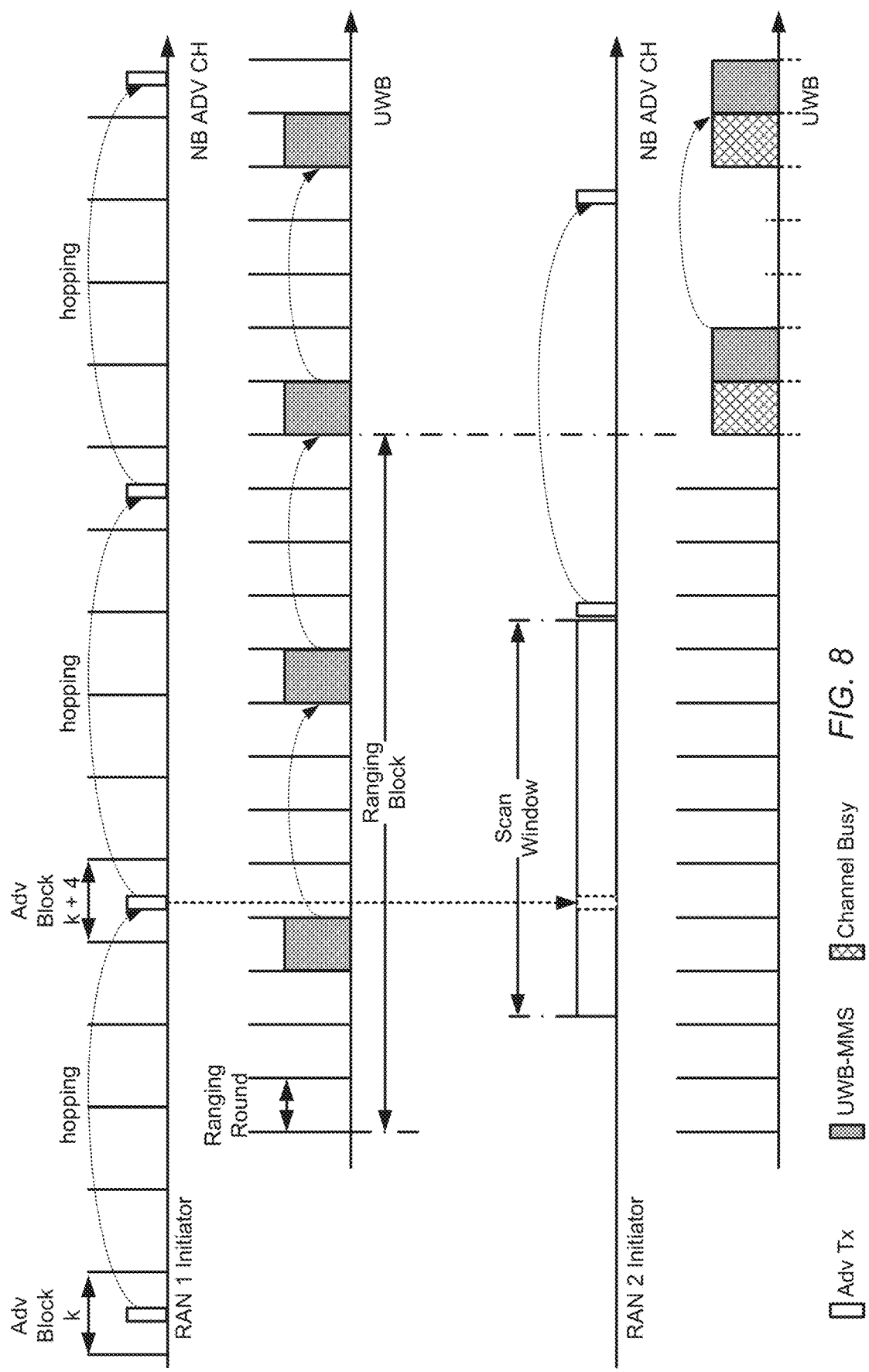
FIG. 8 illustrates an example of RAN coordination for accessing a UWB channel using a decoupled OOB advertisement channel, according to some embodiments.

In some instances, the UWB channel and the narrowband advertisement channel may be decoupled. In such instances, e.g., as illustrated by FIG. 8, a RAN 2 initiator joining a RAN 1 may calculate future RAN 1 transmissions from advertisement packet receipt time and advertisement payload. Thus, as shown, a RAN1 initiator may advertise UWB channel (e.g., UWB) occupation on a narrow band advertisement channel (e.g., NB ADV CH). Further, a RAN 2 initiator may scan the narrow band advertisement channel to determine occupancy of the UWB channel. Then, based on the scanning, the RAN 2 initiator may determine its occupancy on the UWB channel, e.g., to avoid collision with the RAN 1 occupancy of the UWB channel.

Figure 9:
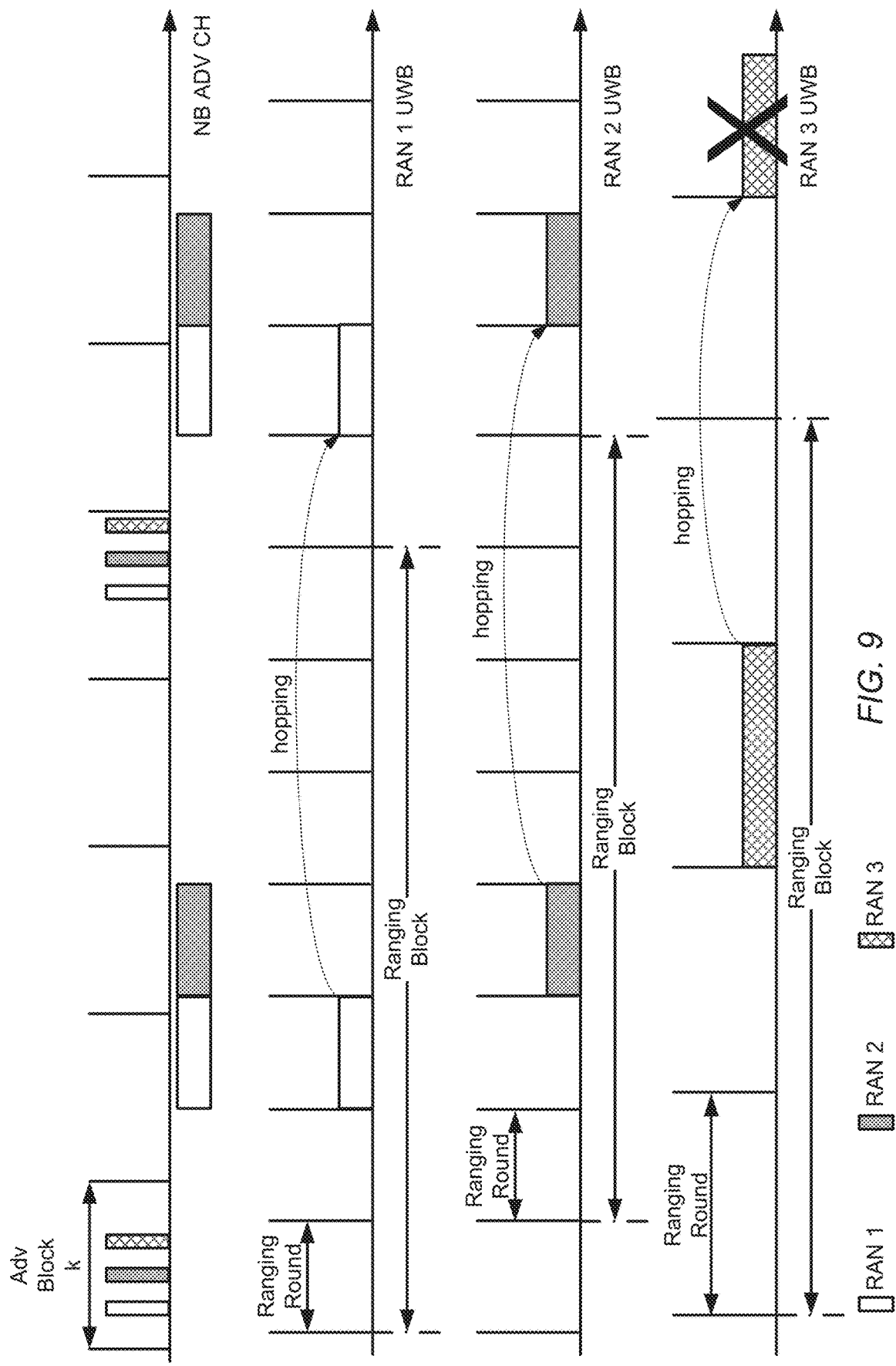
FIG. 9 illustrates another example of RAN coordination for accessing a UWB channel using an OOB advertisement channel, according to some embodiments.

In some instances, e.g., as illustrated by FIG. 9, to enhance UWB channel coexistence, joining RANs may align UWB transmissions with existing RANs and/or avoid collisions with existing RANs by skipping UWB transmissions. Thus, as shown, a RAN 1 initiator, a RAN 2 initiator, and a RAN 3 initiator may advertise UWB occupancy in an advertisement block on a narrowband advertisement channel. Then, based on information in the advertisement received from the RAN 1 initiator, a RAN 2 initiator may align its UWB occupancy and hopping to avoid collisions with RAN 1. Further, a RAN 3 initiator, which may have a different sized ranging block and ranging round than RAN 1 or RAN 2 as well as a different hopping frequency, may determine its UWB occupancy and hopping based on information in the advertisements received from the RAN 1 initiator and the RAN 2 initiator. Further, as shown, the RAN 3 initiator may determine a collision on the UWB with either or both of the RAN 1 or RAN 2 occupancies and cancel at least one of its scheduled occupancies on the UWB, e.g., to avoid a collision with one or both of the RAN 1 or RAN 2 occupancies.

In some instances, more than one mirror (e.g., advertisement) channel may be operated in parallel (e.g., identical MAC, shifted by 1 millisecond each). In some instances, a narrowband advertisement may require 9 microsecond CCA-ED in UNII-5 per ETSI regulatory specifications to resolve conflicts during first advertisement packet slot reservation. In some instances, advertisement packets (e.g., advertisements) may include a UWB preamble to resolve UWB to NB link budget imbalance issues. For example, joining RANs (e.g., devices joining from differing RANs) may perform 802.15.4-2020 CCA mode 5 or 6 on UWB channel directly. Note that UWB pathloss may be estimated by narrowband pathloss, e.g., if the advertisement includes narrowband output power (EIRP). In some instances, existing RANs may (additionally) CCA-ED or receive at known advertisement packet positions of other RANs to gain knowledge of released sessions, and/or resynchronization. For example, an existing RAN may scan one or more narrowband advertisement channels when possible (e.g., 10% duty cycle) to refine initial scan (e.g., to account for devices moving in and/or out of range). In some instances, a responding device may also transmit its RAN's advertisement packets to increase coverage (e.g., CTS frames).

Figure 10:
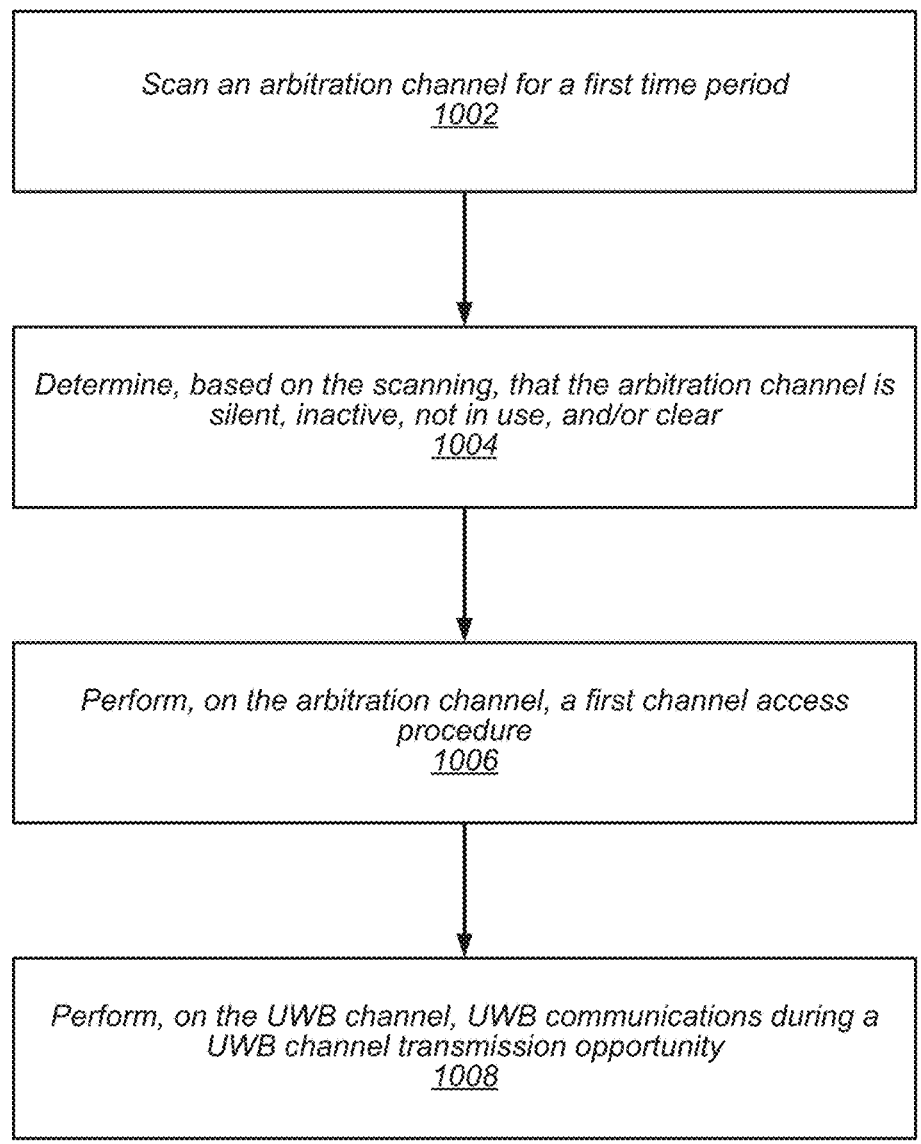
FIG. 10 illustrates a block diagram of an example of a method for UWB channel access, according to some embodiments.

FIG. 10 illustrates a block diagram of an example of a method for ultra-wide band (UWB) channel access, according to some embodiments. The method shown in FIG. 10 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1002, a wireless station, such as wireless station 106, wireless device 110, and/or access point 112, may scan an arbitration channel for a first time period. The arbitration channel may mirror (e.g., may be representative of) activity on a UWB channel. In some instances, to scan the arbitration channel, the wireless station may listen for (one or more) request to send (RTS) and/or clear to send (CTS) frames. The first time period may be greater than a UWB channel transmit opportunity. The arbitration channel may be a narrowband channel. In some instances, the narrowband channel may be a narrowband advertisement channel.

At 1004, the wireless station may determine, based on the scanning, that the arbitration channel is silent, inactive, not in use, and/or clear. In some instances, to determine, based on the scanning, that the arbitration channel is silent, inactive, not in use, and/or clear, the wireless station may determine when no RTS or CTS frames have been received during the first time period.

At 1006, the wireless station may perform, on the arbitration channel, a first channel access procedure.

At 1008, the wireless station may perform, on the UWB channel, UWB communications during a UWB channel transmission opportunity.

In some instances, the wireless station may determine, based on the scanning, that the arbitration channel is occupied, busy, active, in use, and/or not clear. Further, the wireless station may align timing to the arbitration channel and arbitrate for UWB channel access at a subsequent arbitration event (e.g., the wireless station may align its UWB transmissions to avoid collisions with other transmissions on the UWB channel and/or align its UWB occupancy and hopping to avoid collisions with other stations using the UWB channel). In some instances, to determine, based on the scanning, that the arbitration channel is occupied, busy, active, in use, and/or not clear, the wireless station may identify (and/or determine) that at least one RTS or CTS frame has been received during the first time period.

In some instances, to arbitrate for UWB channel access, the wireless station may perform, at the subsequent arbitration event, a second channel access procedure on the arbitration channel for a second time period. Further, the wireless station may determine, based on the second channel access procedure, that the arbitration channel is silent, inactive, not in use, and/or clear and perform UWB communications on the UWB channel responsive to determining that the arbitration channel is silent, inactive, not in use and/or clear. Additionally, in some instances, the wireless station may determine, based on the second channel access procedure, that the arbitration channel is occupied, busy, active, in use, and/or not clear and wait for a subsequent arbitration event to arbitrate for UBW channel access. The second time period may be a random and/or pseudorandom duration of time. In some instances, the second channel access procedure may include a clear channel assessment (CCA) energy detection (ED) procedure. In such instances, to determine, based on the second channel access procedure, that the arbitration channel is silent, inactive, not in use, and/or clear, the wireless station may determine that the CCA-ED is less than a threshold. In some instances, to determine, based on the second channel access procedure, that the arbitration channel is occupied, busy, active, in use, and/or not clear, the wireless station may determine that the CCA-ED is greater than or equal to the threshold.

In some instances, the second channel access procedure may include the wireless station scanning the arbitration channel. In such instances, scanning the arbitration channel may include the wireless station listening for RTS and/or CTS frames. In some instances, to determine, based on the scanning, that the arbitration channel is silent, inactive, not in use, and/or clear, the wireless station may determine when no RTS or CTS frames have been received during the second time period. Similarly, to determine, based on the scanning, that the arbitration channel is occupied, busy, active, in use, and/or not clear, the wireless station may identify (and/or determine) that at least one RTS or CTS frame has been received during the second time period.

In some instances, a synchronizing time may be carried in an RTS frame and/or a CTS frame. In some instances, when the synchronizing time sensed on the arbitration channel is later than a local synchronizing time, the wireless station may set the local synchronizing time to the synchronizing time sensed on the arbitration channel. In some instances, when the synchronizing time sensed on the arbitration channel is earlier than a local synchronizing time, the wireless station may not set the local synchronizing time to the synchronizing time sensed on the arbitration channel.

In some instances, the wireless station may be included in and/or be a part of a first peer-to-peer group. In such instances, the wireless station may receive, while scanning the arbitration channel during the first time period, an indication of coordination information from a second peer-to-peer group. The indication of coordination information may include an indication of a group identifier (ID) of the second peer-to-peer group. Additionally, in some instances, the indication of coordination information may further (and/ or also) include an indication of a UWB channel transmit opportunity sub-slot for transmission during the UWB channel transmission opportunity and/or a frequency offset from a center frequency for transmission in the UWB channel transmission opportunity. In some instances, the indication of coordination information may be carried in at least one of a CTS frame or a RTS frame.

Figure 11:
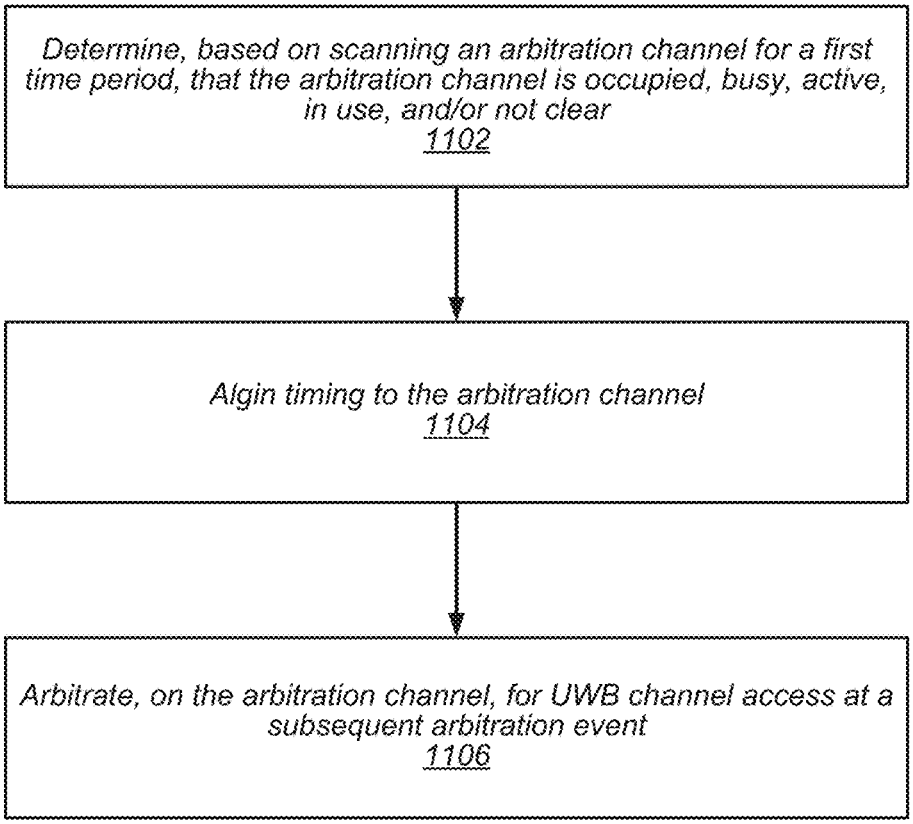
FIG. 11 illustrates a block diagram of another example of a method for UWB channel access, according to some embodiments.

FIG. 11 illustrates a block diagram of another example of a method for UWB channel access, according to some embodiments. The method shown in FIG. 11 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1102, a wireless station, such as wireless station 106, wireless device 110, and/or access point 112, may determine, based on scanning an arbitration channel for a first time period, that the arbitration channel is occupied, busy, active, in use, and/or not clear. The arbitration channel may mirror (e.g., may be representative of) activity on a UWB channel. In some instances, to scan the arbitration channel, the wireless station may listen for (one or more) request to send (RTS) and/or clear to send (CTS) frames. The first time period may be greater than a UWB channel transmit opportunity. The arbitration channel may be a narrowband channel. In some instances, the narrowband channel may be a narrowband advertisement channel.

At 1104, the wireless station may align timing to the arbitration channel (e.g., the wireless station may align its UWB transmissions to avoid collisions with other transmissions on the UWB channel and/or align its UWB occupancy and hopping to avoid collisions with other stations using the UWB channel). In some instances, a synchronizing time may be carried in an RTS frame and/or a CTS frame. In some instances, when the synchronizing time sensed on the arbitration channel is later than a local synchronizing time, the wireless station may set the local synchronizing time to the synchronizing time sensed on the arbitration channel. In some instances, when the synchronizing time sensed on the arbitration channel is earlier than a local synchronizing time, the wireless station may not set the local synchronizing time to the synchronizing time sensed on the arbitration channel.

At 1106, the wireless station may arbitrate, on the arbitration channel, for UWB channel access at a subsequent arbitration event. In some instances, to arbitrate for UWB channel access, the wireless station may perform, at the subsequent arbitration event, a second channel access procedure on the arbitration channel for a second time period. Further, the wireless station may determine, based on the second channel access procedure, that the arbitration channel is silent, inactive, not in use, and/or clear and perform UWB communications on the UWB channel responsive to determining that the arbitration channel is silent, inactive, not in use and/or clear. Additionally, in some instances, the wireless station may determine, based on the second channel access procedure, that the arbitration channel is occupied, busy, active, in use, and/or not clear and wait for a subsequent arbitration event to arbitrate for UBW channel access. The second time period may be a random and/or pseudo-random duration of time. In some instances, the second channel access procedure may include a clear channel assessment (CCA) energy detection (ED) procedure. In such instances, to determine, based on the second channel access procedure, that the arbitration channel is silent, inactive, not in use, and/or clear, the wireless station may determine that the CCA-ED is less than a threshold. In some instances, to determine, based on the second channel access procedure, that the arbitration channel is occupied, busy, active, in use, and/or not clear, the wireless station may determine that the CCA-ED is greater than or equal to the threshold.

In some instances, the second channel access procedure may include the wireless station scanning the arbitration channel. In such instances, scanning the arbitration channel may include the wireless station listening for RTS and/or CTS frames. In some instances, to determine, based on the scanning, that the arbitration channel is silent, inactive, not in use, and/or clear, the wireless station may determine when no RTS or CTS frames have been received during the second time period. Similarly, to determine, based on the scanning, that the arbitration channel is occupied, busy, active, in use, and/or not clear, the wireless station may identify (and/or determine) that at least one RTS or CTS frame has been received during the second time period.

In some instances, the wireless station may determine, based on the scanning, that the arbitration channel is silent, inactive, not in use, and/or clear. In some instances, to determine, based on the scanning, that the arbitration channel is silent, inactive, not in use, and/or clear, the wireless station may determine when no RTS or CTS frames have been received during the first time period. In such instances, the wireless station may perform, on the arbitration channel, a first channel access procedure and perform, on the UWB channel, UWB communications during a UWB channel transmission opportunity.

In some instances, the wireless station may be included in and/or be a part of a first peer-to-peer group. In such instances, the wireless station may receive, while scanning the arbitration channel during the first time period, an indication of coordination information from a second peer-to-peer group. The indication of coordination information may include an indication of a group identifier (ID) of the second peer-to-peer group. Additionally, in some instances, the indication of coordination information may further (and/or also) include an indication of a UWB channel transmit opportunity sub-slot for transmission during the UWB channel transmission opportunity and/or a frequency offset from a center frequency for transmission in the UWB channel transmission opportunity. In some instances, the indication of coordination information may be carried in at least one of a CTS frame or a RTS frame.

Figure 12:
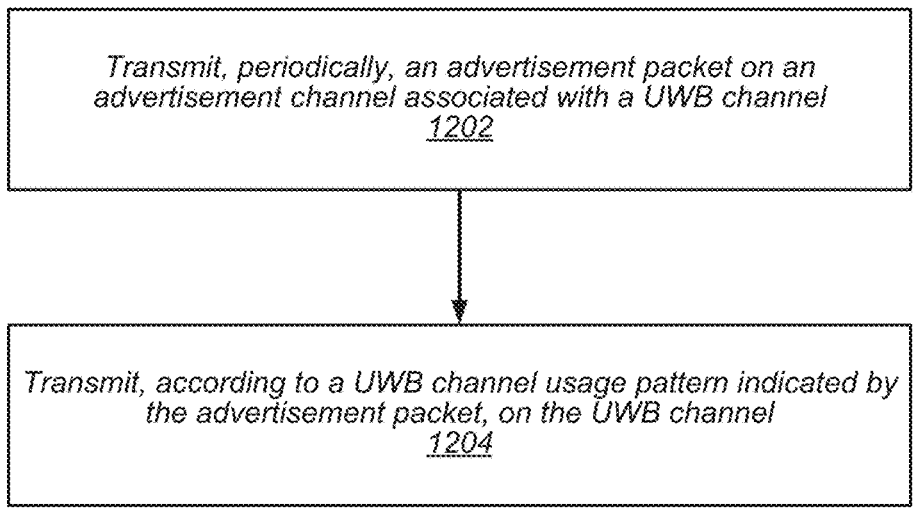
FIG. 12 illustrates a block diagram of an example of a method for UWB channel access coordination, according to some embodiments.

FIG. 12 illustrates a block diagram of an example of a method for UWB channel access coordination, according to some embodiments. The method shown in FIG. 12 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1202, a wireless station, such as wireless station 106, wireless device 110, and/or access point 112, may transmit, periodically, an advertisement packet on an advertisement channel associated with a UWB channel. In some instances, the advertisement channel associated with the UWB channel may include a narrowband advertisement channel.

At 1204, the wireless station may transmit, according to a UWB channel usage pattern indicated by the advertisement packet, on the UWB channel. In other words, the wireless station may transmit on the UWB channel in accordance with a UWB channel usage pattern indicated by the advertisement packet. In some instances, to indicate the UWB channel usage pattern, the advertisement packet may include one or more of a UWB transmit start time offset, a UWB transmit duration, a UWB transmit interval, information from which a UWB transmit interval can be determined, and/or UWB transmission type.

In some instances, the wireless station may scan, prior to transmitting a first advertisement packet, the advertisement channel for at least a first period of time. The first period of time may be at least equal to a periodicity of the transmitting of the advertisement packet. In some instances, the scanning may aid in discovery of neighboring wireless stations attempting to access the UWB channel.

In some instances, the wireless station may perform a channel access scan on the advertisement channel and determine, based on the channel access scan, that the advertisement channel is occupied, busy, active, in use, and/or not clear. In addition, the wireless station may repeat, at a next advertisement period, the channel access scan of the advertisement channel. In some instances, to perform the channel access scan on the advertisement channel, the wireless station may perform a clear channel access energy detection (CCA-ED) operation (or procedure) on the advertisement channel. In such instances, to determine, based on the channel access scan, that the advertisement channel is occupied, busy, active, in use, and/or not clear, the wireless station may determine that a value of the CCA-ED operation is greater than or equal to a threshold.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a wireless device may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A device, comprising:
at least one antenna;
at least one radio coupled to the at least one antenna, wherein the at least one radio comprises circuitry supporting at least two radio access technologies (RATs); and
a processing element coupled to the at least one radio;
wherein the processing element is configured to cause the device to:
scan an arbitration channel for a first time period, wherein the arbitration channel mirrors activity on a UWB channel;
wherein, when, based on the scanning, the arbitration channel is determined to be in use, the processing element is configured to cause the device to:
align timing to the arbitration channel; and
arbitrate for UWB channel access at a subsequent arbitration event; and
wherein, when, based on the scanning, that the arbitration channel is determined to not be in use, the processing element is configured to cause the device to:
perform, on the arbitration channel, a first channel access procedure; and
perform, on the UWB channel, UWB communications during a UWB channel transmission opportunity.

2. The device of claim 1,
wherein, to scan the arbitration channel, the processing element is configured to listen for one or more request to send (RTS) or clear to send (CTS) frames during the first time period.

3. The device of claim 2,
wherein to determine, based on the scanning, that the arbitration channel is not in use, the processing element is configured to determine when no RTS or CTS frames have been received during the first time period.

4. The device of claim 1,
wherein to determine, based on the scanning, that the arbitration channel is in use, the processing element is configured to identify that at least one request to send (RTS) or clear to send (CTS) frame has been received during the first time period.

5. The device of claim 4,
wherein a synchronizing time is carried in an RTS frame or a CTS frame;
wherein, when the synchronizing time sensed on the arbitration channel is later than a local synchronizing time, the processing element is configured to set the local synchronizing time to the synchronizing time sensed on the arbitration channel; and
wherein, when the synchronizing time sensed on the arbitration channel is earlier than a local synchronizing time, the processing element is configured to not set the local synchronizing time to the synchronizing time sensed on the arbitration channel.

6. The device of claim 1,
wherein, to arbitrate for UWB channel access, the processing element is configured to:
perform, at the subsequent arbitration event, a second channel access procedure on the arbitration channel for a second time period.

7. The device of claim 6,
wherein the processing element is further configured to:
determine, based on the second channel access procedure, that the arbitration channel is not in use; and
perform UWB communications on the UWB channel responsive to determining that the arbitration channel is not in use.

8. The device of claim 6,
wherein the processing element is further configured to:
determine, based on the second channel access procedure, that the arbitration channel is in use and to wait for a subsequent arbitration event to arbitrate for UBW channel access.

9. The device of claim 6,
wherein the second time period is a pseudorandom duration of time.

10. The device of claim 1,
wherein the device is comprised in a first peer-to-peer group, and wherein the processing element is further configured to cause the device to:
receive, while scanning the arbitration channel during the first time period, an indication of coordination information from a second peer-to-peer group, wherein the indication of coordination information includes an indication of a group identifier (ID) of the second peer-to-peer group, and wherein the indication of coordination information further includes one or more of an indication of a UWB channel transmit opportunity sub-slot for transmission during the UWB channel transmission opportunity or a frequency offset from a center frequency for transmission in the UWB channel transmission opportunity.

11. An apparatus, comprising:
a memory; and
at least one processor in communication with the memory;
wherein the at least one processor is configured to:
scan an arbitration channel for a first time period, wherein the arbitration channel is representative of activity on a UWB channel;
determine, based on the scanning, that the arbitration channel is in use;
align timing to the arbitration channel; and
arbitrate for UWB channel access at a subsequent arbitration event.

12. The apparatus of claim 11,
wherein a synchronizing time is carried in an RTS frame or a CTS frame.

13. The apparatus of claim 12,
wherein, when the synchronizing time sensed on the arbitration channel is later than a local synchronizing time, the at least one processor is configured to set the local synchronizing time to the synchronizing time sensed on the arbitration channel.

14. The apparatus of claim 12,
wherein, when the synchronizing time sensed on the arbitration channel is earlier than a local synchronizing time, the at least one processor is configured to not set the local synchronizing time to the synchronizing time sensed on the arbitration channel.

15. The apparatus of claim 11,
wherein, to arbitrate for UWB channel access, the at least one processor is configured to:
perform, at the subsequent arbitration event, a second channel access procedure on the arbitration channel for a second time period.

16. The apparatus of claim 11,
wherein to determine, based on the scanning, that the arbitration channel is in use, the at least one processor is configured to identify that at least one request to send (RTS) or clear to send (CTS) frame has been received during the first time period.

17. A non-transitory computer readable memory medium storing program instructions that, when executed, cause a device to:
scan an arbitration channel for a first time period, wherein the arbitration channel is representative of activity on a UWB channel;
wherein, when, based on the scanning, the arbitration channel is determined to be in use, the program instructions are executable to cause the device to:
align timing to the arbitration channel; and
arbitrate for UWB channel access at a subsequent arbitration event; and
wherein, when, based on the scanning, that the arbitration channel is determined to not be in use, the program instructions are executable to cause the device to:
perform, on the arbitration channel, a first channel access procedure; and
perform, on the UWB channel, UWB communications during a UWB channel transmission opportunity.

18. The non-transitory computer readable memory medium of claim 17,
wherein the first time period is greater than a UWB channel transmit opportunity.

19. The non-transitory computer readable memory medium of claim 17,
wherein the arbitration channel comprises a narrowband advertisement channel.

20. The non-transitory computer readable memory medium of claim 17,
wherein the device is comprised in a first peer-to-peer group, and wherein the program instructions are further executable to cause the device to:
receive, while scanning the arbitration channel during the first time period, an indication of coordination information from a second peer-to-peer group, wherein the indication of coordination information includes an indication of a group identifier (ID) of the second peer-to-peer group, and wherein the indication of coordination information further includes one or more of an indication of a UWB channel transmit opportunity sub-slot for transmission during the UWB channel transmission opportunity or a frequency offset from a center frequency for transmission in the UWB channel transmission opportunity.

* * * * *